United States Patent
Kori

(10) Patent No.: US 6,223,236 B1
(45) Date of Patent: Apr. 24, 2001

(54) HIERARCHICAL BUS STRUCTURE DATA PROCESSING APPARATUS AND METHOD WITH REDUCED DATA TRANSFER VOLUME

(75) Inventor: Mitsunori Kori, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/204,076

(22) Filed: Dec. 3, 1998

(30) Foreign Application Priority Data

Jun. 5, 1998 (JP) .................................................. 10-156976

(51) Int. Cl.[7] ........................... G06F 13/14; G06F 13/20; G06F 13/40

(52) U.S. Cl. ........................ 710/120; 710/126; 710/128; 710/131; 711/202

(58) Field of Search ................................... 710/120, 126, 710/128, 131; 711/202

(56) References Cited

U.S. PATENT DOCUMENTS

| 4,647,123 | * | 3/1987 | Chin et al. ............................. 339/17 |
| 5,568,620 | | 10/1996 | Sarangdhar et al. ................. 395/285 |
| 5,594,926 | | 1/1997 | Chang et al. ......................... 395/872 |
| 6,052,752 | * | 4/2000 | Kwon .................................... 710/126 |
| 6,073,225 | * | 6/2000 | James et al. ......................... 711/202 |

FOREIGN PATENT DOCUMENTS

| 0154551 | 9/1985 | (EP) . |
| 2220509 | 1/1990 | (GB) . |
| 4137165 | 5/1992 | (JP) . |
| 5120240 | 5/1993 | (JP) . |
| 6149781 | 5/1994 | (JP) . |
| 9269927 | 10/1997 | (JP) . |
| WO9633466 | 10/1996 | (WO) . |

OTHER PUBLICATIONS

Fryer, Ron; "Teradata Version 2: Critical Success Factors for Data Warehouses", NCR Mar. 11, 1996, pp. 1–21.

"ServerNet Interconnect Technology", Tandem 1995, pp. 1–7.

"Peer–to–Peer Proposal—Revision 0.14 version 7", I2O SIG, Oct. 20, 1997, pp. 122–133.

* cited by examiner

Primary Examiner—Thomas Lee
Assistant Examiner—Rehana Perveen
(74) Attorney, Agent, or Firm—Leydig, Voit & Mayer, Ltd.

(57) ABSTRACT

A data processing apparatus with a hierarchical bus for realizing appropriate data transfer speed and data processing speed, even if more I/O devices are connected to the data processing apparatus. Processors are provided in a part or all of the layers in the hierarchical bus. The processors perform selection, projection, and accumulation of data transmitted from I/O devices to a main memory. Accordingly, the quantity of data transmitted to a system bus at an upper layer can be reduced, and the quantity of data processed by the central processing unit can be reduced.

14 Claims, 23 Drawing Sheets

Fig. 8

| 64: KEY FIELD | 65: NUMERIC FIELD | 66: DATE FIELD | |
|---|---|---|---|
| | | | |
| TV | 55000 | APR.1,1998 | |
| REFRIGE. | 98000 | APR.18,1998 | |
| WASH.M. | 78000 | MAY.10,1998 | |
| TV | 40000 | MAY.15,1998 | |
| REFRIGE. | 38000 | MAY.18,1998 | |
| RADIO | 3000 | MAY.20,1998 | |
| TV | 55000 | MAY.25,1998 | |
| WASH.M. | 65000 | MAY.30,1998 | |
| TV | 88000 | MAY.30,1998 | |
| WASH.M. | 58000 | JUNE.5,1998 | |
| REFRIGE. | 88000 | JUNE.10,1998 | |
| VIDEO | 60000 | JUNE.20,1998 | |
| TV | 30000 | JUNE.25,1998 | |
| | | ⋮ | |

63a: RECORD
63b: RECORD
63c: RECORD
63d: RECORD
63e: RECORD
63f: RECORD
63g: RECORD
63h: RECORD
63i: RECORD
63j: RECORD
63k: RECORD
63l: RECORD
63m: RECORD

62a: BLOCK

Fig. 12

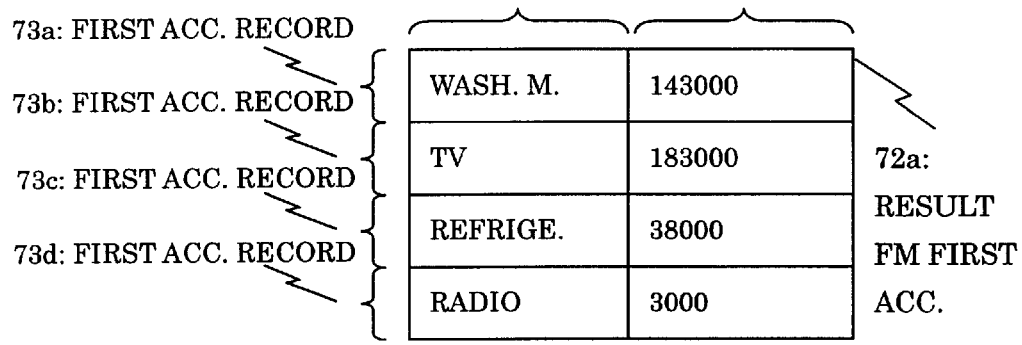

73a: FIRST ACC. RECORD
73b: FIRST ACC. RECORD
73c: FIRST ACC. RECORD
73d: FIRST ACC. RECORD

74: FIRST ACC. KEY F.　　75: FIRST ACC. NUM. F.

| WASH. M. | 143000 |
| TV | 183000 |
| REFRIGE. | 38000 |
| RADIO | 3000 |

72a: RESULT FM FIRST ACC.

77

BLOCK ACC.

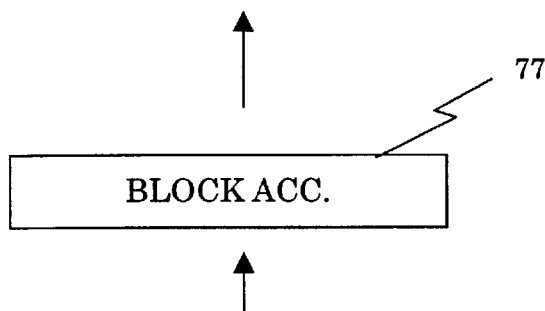

64: KEY FIELD　　65: NUMERIC FIELD

163c: POST-SELECT.- PROJ. RECORD
163d: POST-SELECT.- PROJ. RECORD
163e: POST-SELECT.- PROJ. RECORD
163f: POST-SELECT.- PROJ. RECORD
163g: POST-SELECT.- PROJ. RECORD
163h: POST-SELECT.- PROJ. RECORD
163i: POST-SELECT.- PROJ. RECORD

| WASH. M. | 78000 |
| TV | 40000 |
| REFRIGE. | 38000 |
| RADIO | 3000 |
| TV | 55000 |
| WASH. M. | 65000 |
| TV | 88000 |

67: RESULT FM SELECT.- PROJ.

HIERARCHICAL BUS STRUCTURE DATA PROCESSING APPARATUS AND METHOD WITH REDUCED DATA TRANSFER VOLUME

BACKGROUND OF THE INVENTION

1. Field of the Invention

This invention relates to a data processing apparatus with an input/output (I/O) device and a data processing method.

2. Description of the Related Art

An I/O device, e.g., disk controller, network controller, etc. is usually connected to a bus. Since the number of devices connectable to a bus is restricted by an electrical condition of the bus, number of control signals, etc., the number of the devices connected to the bus is limited.

The number of devices connectable to the bus can be increased by layering the bus. The layered bus is called as a hierarchical bus, hereinafter. In the hierarchical bus, a bus coupler is provided between a bus at an upper layer and a bus at a lower layer. The bus coupler relays data from a bus to an appropriate bus based on a destination address of the data transmitted in the bus.

FIG. 23 illustrates a data transfer system with the hierarchical bus according to the related art. In FIG. 23, disk controllers and magnetic disk drives (or also called as disk drives, hereinafter) controlled by the disk controllers are provided as the I/O devices for example. Normally, an origin or destination of a data transfer is a main memory, and the main memory is shared by all the I/O devices. Therefore, the main memory is connected to a top layer in the hierarchical bus.

Operations are explained with reference to FIG. 23.

Data in files 61a–61f in disk drives 8a–8f are transferred to buffers 10a–10f in a main memory 2, and processed by a central processing unit (CPU) 1.

The CPU 1 requests a disk controller 7a to transfer the data in the file 61a in the disk drive 8a to the buffer 10a. The disk controller 7a transfers the data to an I/O bus 5a. An I/O bus coupler 6a relays the data from the I/O bus 5a to an I/O bus 5d. A system bus-I/O bus coupler 4 relays the data from the I/O bus 5d to a system bus 3. Then, the data are stored in the buffer 10a in the main memory 2.

The CPU 1 also requests a disk controller 7b to transfer the data in the file 61b in the disk drive 8b to the buffer 10b. The disk controller 7b transfers the data to the I/O bus 5a. The I/O bus coupler 6a relays the data from the I/O bus 5a to the I/O bus 5d. The system bus-I/O bus coupler 4 relays the data from the I/O bus 5d to the system bus 3. Then, the data are stored in the buffer 10b in the main memory 2.

The CPU 1 also requests a disk controller 7c to transfer the data in the file 61c in the disk drive 8c to the buffer 10c. The disk controller 7c transfers the data to an I/O bus 5b. An I/O bus coupler 6b relays the data from the I/O bus 5b to the I/O bus 5d. The system bus-I/O bus coupler 4 relays the data from the I/O bus 5d to the system bus 3. Then, the data are stored in the buffer 10c in the main memory 2.

The CPU 1 also requests a disk controller 7d to transfer the data in the file 61d in the disk drive 8d to the buffer 10d. The disk controller 7d transfers the data to the I/O bus 5b. The I/O bus coupler 6b relays the data from the I/O bus 5b to the I/O bus 5d. The system bus-I/O bus coupler 4 relays the data from the I/O bus 5d to the system bus 3. Then, the data are stored in the buffer 10d in the main memory 2.

The CPU 1 also requests a disk controller 7e to transfer the data in the file 61e in the disk drive 8e to the buffer 10e. The disk controller 7e transfers the data to an I/O bus 5c. An I/O bus coupler 6c relays the data from the I/O bus 5c to the I/O bus 5d. The system bus-I/O bus coupler 4 relays the data from the I/O bus 5d to the system bus 3. Then, the data are stored in the buffer 10e in the main memory 2.

The CPU 1 also requests a disk controller 7f to transfer the data in the file 61f in the disk drive 8f to the buffer 10f. The disk controller 7f transfers the data to the I/O bus 5c. The I/C bus coupler 6c relays the data from the I/O bus 5c to the I/O bus 5d. The system bus-I/O bus coupler 4 relays the data from the I/C bus 5d to the system bus 3. Then, the data are stored in the buffer 10f in the main memory 2.

The CPU 1 processes the data transferred to the buffers 10a–10f, and stores a result from processing in a last output buffer 101.

As stated, the data are always transferred to the main memory 2 via the I/O bus 5d, system bus-I/O bus coupler 4, and system bus 3. The data transferred from all the I/O devices connected at lower layers in the hierarchical bus are channeled through the buses at upper layers in the hierarchical bus.

However, since data transfer in a bus per unit time is generally limited, data exceeding the limit cannot be transferred.

When a bus is occupied for a transfer of data, even if a transfer of other data is requested, the latter data cannot be transferred until the first data transfer is completed. When the data in the files 61a–61e are transferred at once, transfer speed of the data is restricted by transfer speeds of data in the I/O bus 5d and system bus 3. Therefore, even if the number of connectable devices is increased by adopting the hierarchical bus, the data transfer speed of the system is restricted by the transfer speed of the bus at the top layer. Hence, a data transfer speed appropriate for the number of devices cannot be realized.

In the hierarchical bus according to the related art, the CPU 1 processes all the data. Since the data processed by the CPU per unit time period is limited, data exceeding the limit cannot be processed. When the CPU 1 processes the data transferred from the files 61a–61e, a processing speed of the data is restricted by the processing speed of the CPU 1. Even if the number of connectable devices is increased by adopting the hierarchical bus, the processing speed of the system is restricted by the processing speed of the CPU, and the data processing speed appropriate for the number of devices cannot be realized.

The hierarchical bus according to the related art is configured as above stated, and all the transferred data are channeled through the buses at upper layers. Therefore, even if the number of connectable devices is increased, an appropriate data transfer speed cannot be realized.

The hierarchical bus according to the related art is configured as above stated, and the processing speed of data is restricted by the processing speed of the CPU. Therefore, even if the number of connectable devices is increased, an appropriate processing speed cannot be realized.

SUMMARY OF THE INVENTION

It is an object of this invention to solve the above-stated problems in the related art. Particularly, this invention aims at increasing the number of connectable devices by adopting a hierarchical bus and improving a transfer speed when the number of the devices is increased.

This invention also aims at increasing the number of connectable devices by adopting the hierarchical bus and improving processing speed when the number of the devices is increased.

According to one aspect of this invention, a data processing apparatus includes an upper bus and a lower bus connected hierarchically, a memory connected to the upper bus, a device connected to the lower bus, a processor, connected to the lower bus, for receiving data from the device via the lower bus, extracting a part of the received data, and transferring the extracted data to the memory via the upper bus, and a processing unit connected to the upper bus for processing the transferred data in the memory.

According to another aspect of this invention, a data processing method includes the steps of transferring data from the device to the processor via the lower bus, extracting a part of the transferred data by the processor, transferring the extracted data to the memory via the upper bus, and processing the transferred data in the memory by the processing unit.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 8 illustrates a configuration of a block constituting a file in an embodiment of this invention;

FIG. 12 illustrates a sample of aback accumulation processing and its result from the first accumulation in an embodiment of this invention;

DETAILED DESCRIPTION OF THE PREFERRED EMBODIMENTS

Embodiment 1

Figure 1:
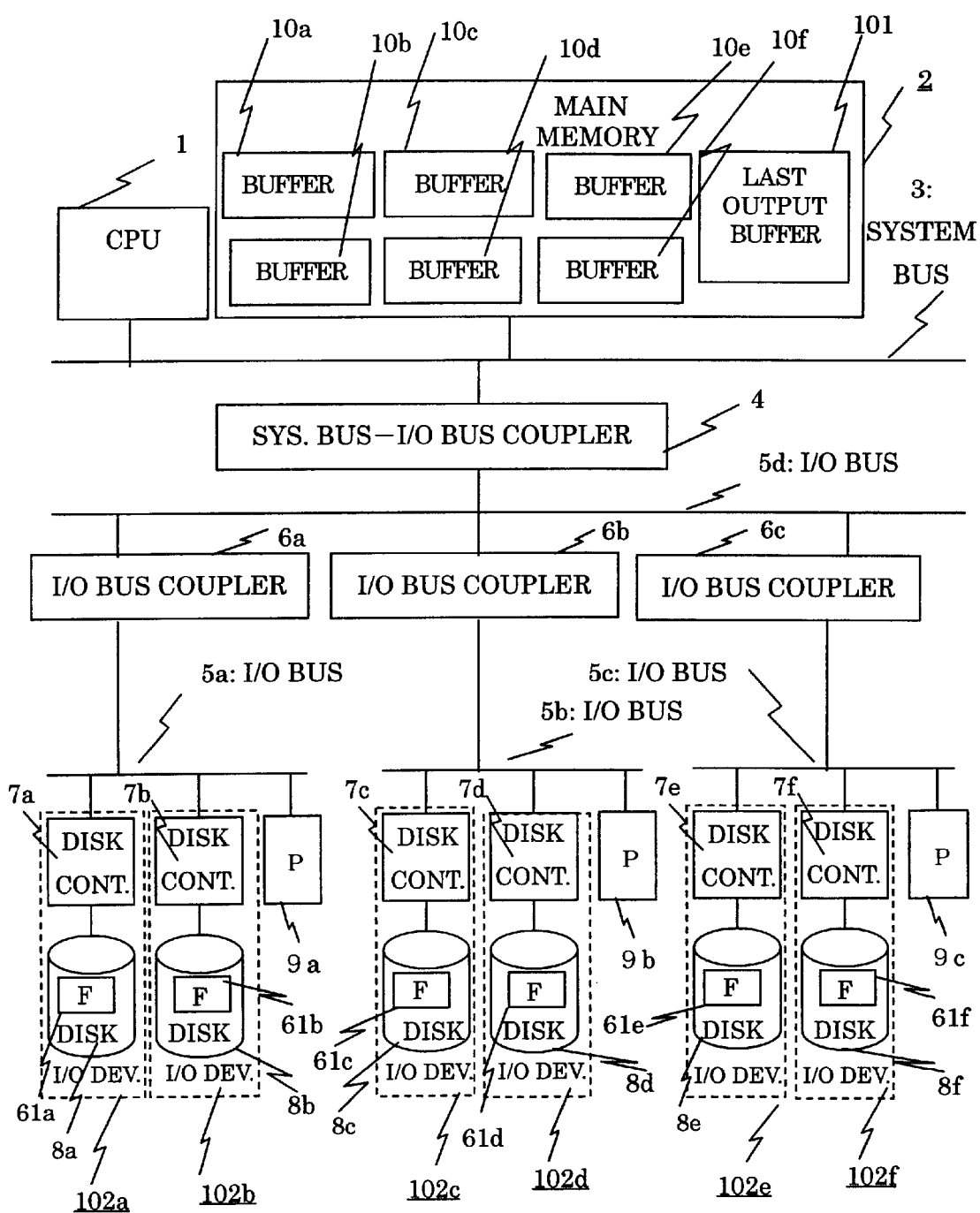
FIG. 1 shows a system configuration chart in an embodiment of this invention.

FIG. 1 illustrates a configuration of a system for realizing an embodiment of this invention.

In FIG. 1, the central processing unit (CPU) 1 controls each unit in the whole system. The main memory 2 is also illustrated. The system bus 3 is a channel for a data transfer between the CPU 1 and the main memory 2 and a data transfer between the system bus—I/O bus coupler 4 and the main memory 2. The system bus-I/O bus coupler 4 relays data transferred between a device connected to an I/O bus and a device connected to the system bus. An I/O device, e.g., disk controller, etc. or bus coupler is connected to the I/O buses 5a–5d. The I/O buses 5a–5d are controlled in a different procedure from the system bus 3. Each of the I/O bus couplers 6a –6c is connected to two of the I/O buses for relaying the data transferred between I/O devices or bus couplers connected to the different I/O buses. The system bus 3 and all the I/O buses 5a–5d are assumed to have the same physical address space.

Each of I/O devices 102a–102f includes a disk controller and a magnetic disk drive. The disk controllers 7a–7f control the magnetic disk drives (or also called as disk drives) 8a–8f respectively. Processors 9a–9c are provided. The buffers 10a–10c are provided in the main memory 2. The files 61a–61f are stored in the disk drives 8a–8f respectively. The last output buffer 101 is also provided in the main memory 2.

Figure 2:
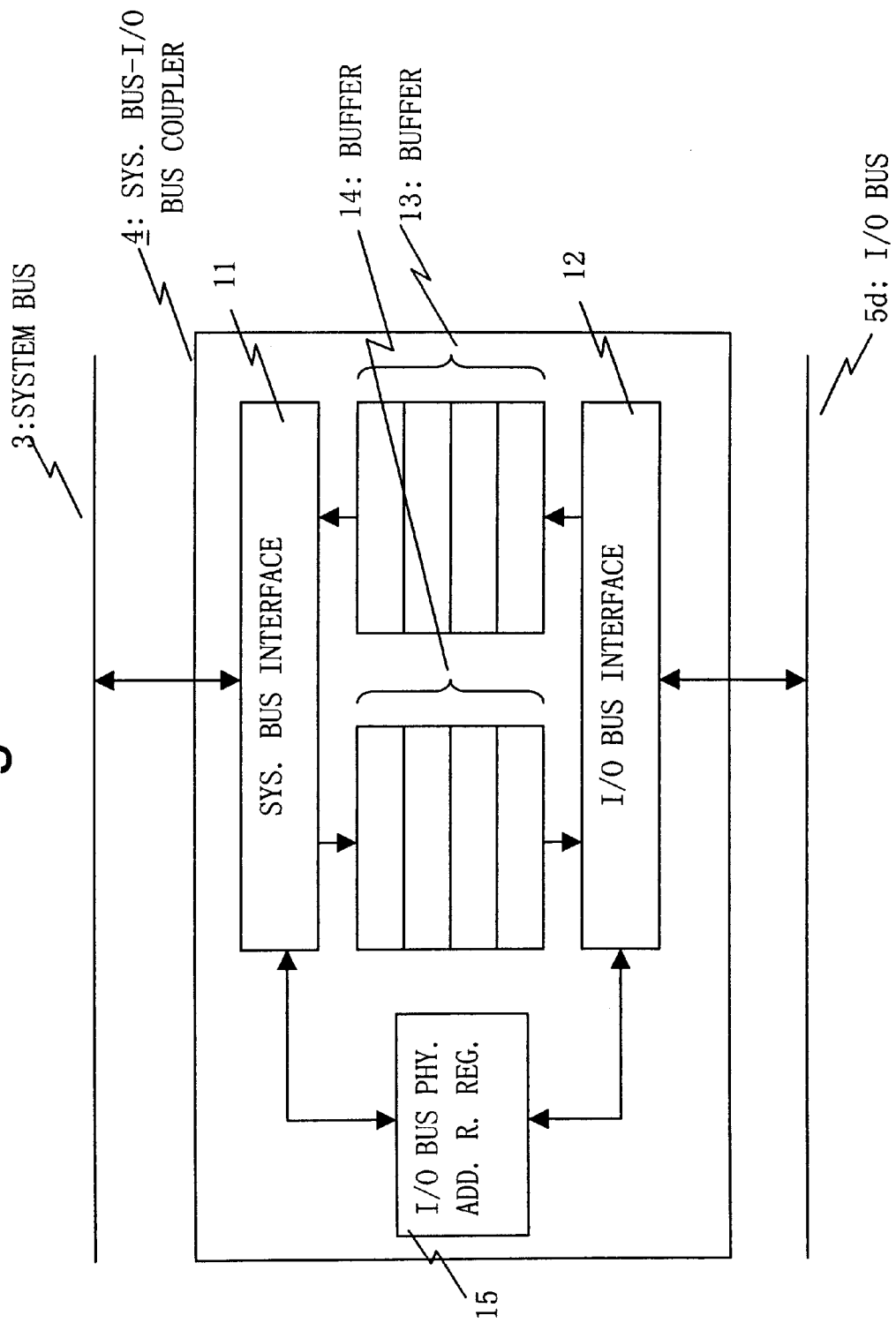
FIG. 2 shows a configuration chart of a system bus-I/O bus coupler in an embodiment of this invention.

FIG. 2 illustrates a configuration of the system bus-I/O bus coupler 4 according to this embodiment.

In FIG. 2, the system bus 3 and the I/O bus 5d are illustrated. A system bus interface 11, an I/O bus interface 12, and buffers 11 and 14 are also illustrated. When data are transferred from the I/O bus 5d to the system bus 3, the data are stored in the buffer 13 temporarily. When data are transferred from the system bus 3 to the I/O bus 5d, the data are stored in the buffer 14 temporarily. A physical address range of the I/O bus 5d is stored in an I/O bus physical address range register 15. A physical address can be assigned to the I/O bus 5d by providing the physical address range of the I/O bus 5d in the I/O bus physical address range register 15.

When a request for transfer of the physical address range provided in the I/O bus physical address range register 15 is transmitted to the system bus 3, the system bus-I/O bus coupler 4 responds to the request. If the request is a transfer of data from the system bus 3 to the I/O bus 5d, the system bus interface 11 responds to the request in the system bus 3, and stores the data sent from the system bus 3 in the buffer 14. Then, the data are transferred to the I/O bus 5d via the I/O bus interface 12. If the request is a transfer of data from the I/O bus 5d to the system bus 3, the I/O bus interface 12 relays the request for transfer of the address range assigned to the I/O bus 5d, and receives transferring data from the I/O bus 5d. Then, the data are stored in the buffer 13, and transferred to the system bus 3 via the system bus interface 11. The system bus-I/O bus coupler 4 does not respond to a request for transfer in the system bus 3 for a physical address range which is not provided in the I/O bus physical address range register 15.

However, when a request for transfer of a physical address range which is not provided in the I/O bus physical address range register 15 is transferred to the I/O bus 5d, the system bus-I/O bus coupler 4 responds to the request If the request is a transfer of data from the I/O bus 5d to the system bus 3, the I/O bus interface 12 responds to the request in the I/O bus 5d, and stores the data sent from the I/O bus 5d in the buffer 13. Then, the data are transferred to the system bus 3 via the system bus interface 11. If the request is a transfer of data from the system bus 3 to the I/O bus 5d, the system bus interface 11 relays the request for transfer of the address range assigned to the system bus 3, and receives the data from the system bus 3. Then, the data are stored in the buffer 14, and transferred to the I/O bus 5d via the I/O bus interface 12. The system bus-I/O bus coupler 4 does not respond to a request for transfer in the I/O bus 5d for a physical address range which is provided in the I/O bus physical address range register 15.

Figure 3:
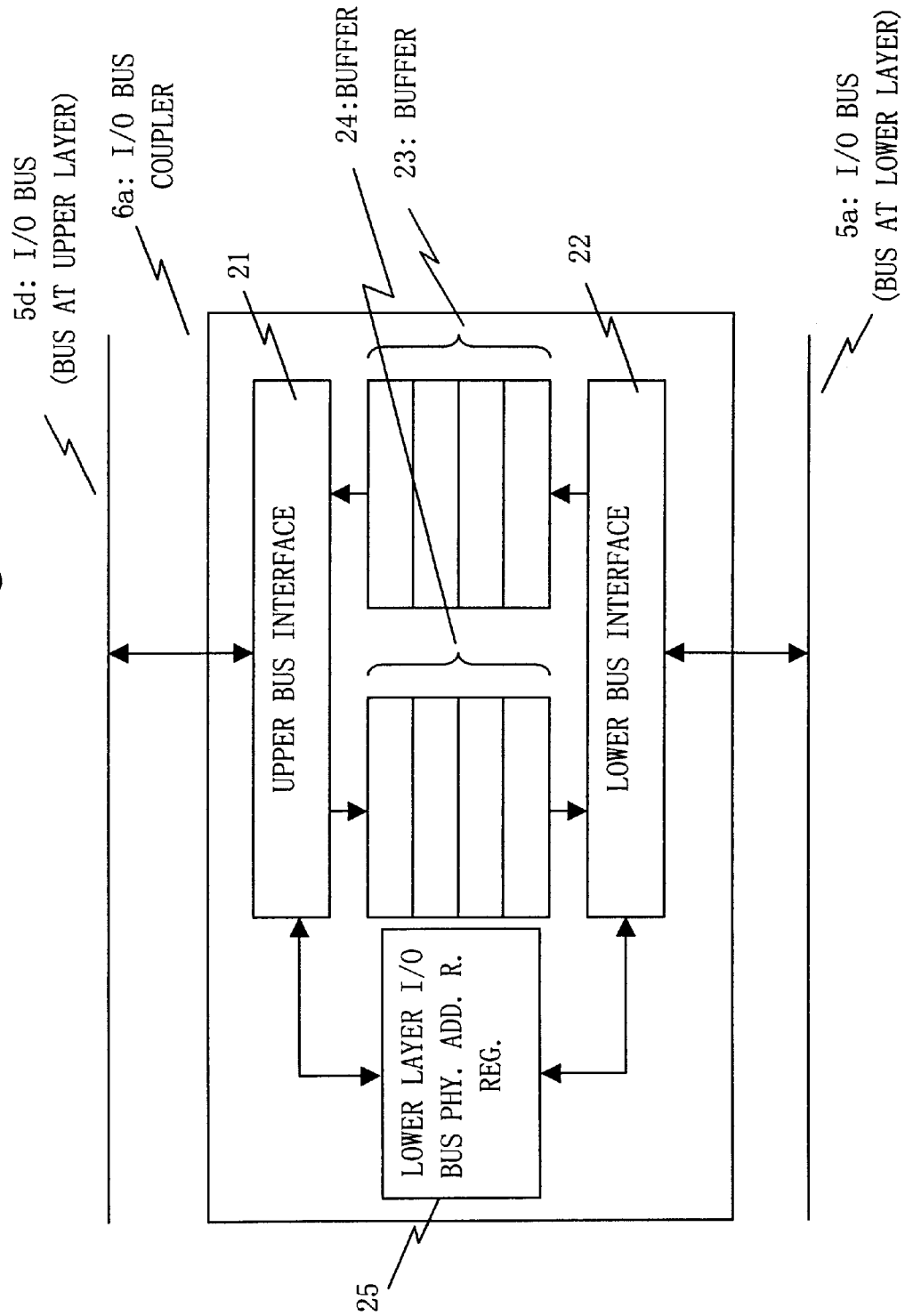
FIG. 3 shows a configuration chart of an I/O bus coupler in an embodiment is invention.

FIG. 3 illustrates a configuration of the I/O bus coupler 6a according to this embodiment. The configuration of the I/O bus couplers 6b and 6c are the same as FIG. 3.

In FIG. 3, the I/O bus 5d vat an upper layer and the I/O bus 5a at a lower layer are illustrated. An upper bus interface 21, a lower bus interface 22, and buffers 23 and 24 are also illustrated. Data transferred from the I/O bus 5a at the lower layer to the I/O bus 5d at the upper layer is temporarily stored in the buffer 23. Data transferred from the I/O bus 5d at the upper layer to the I/O bus 5a at the lower layer is temporarily stored in the buffer 24. A physical address range of the I/O bus 5a at the lower layer is stored at a lower layer I/O bus physical address range register 25 temporarily. A physical address can be assigned to the I/O bus 5a at the lower layer by providing a physical address range of the I/O bus 5a at the lower layer in the I/O bus physical address range register 25.

The I/O bus coupler 6a responds to the request for transfer of the data in the I/O bus 5d at the upper layer for a physical address range provided in the lower layer I/O bus physical address range register 25. If the request is a transfer of the data from the I/O bus 5d at the upper layer to the I/O bus 5a at the lower layer, the upper bus interface 21 responds to the request for transfer of the data in the I/O bus 5d at the upper layer, and stores the data transferred from the I/O bus 5d at the upper layer in the buffer 24. Then, the data are transferred to the I/O bus 5a via the lower bus interface 22. If the transfer of the data is from the I/O bus 5a at the lower layer to the I/O bus 5d at the upper layer, the lower bus interface 22 relays the request for transfer of the concerned address to the I/O bus 5d, and receives the transferred data from the I/O bus 5a at the lower layer. Then, the data are stored in the buffer 23. The data are transferred to the I/O bus 5d at the upper layer via the upper bus interface 21. The I/O bus coupler 6a does not respond to a request for transfer of a physical address range which is not provided in the I/O bus physical address range register 25 in the I/O bus at the upper layer.

The system bus-I/O bus coupler 4 responds to a request for transfer in the I/O bus 5a at the lower layer for the physical address range besides the physical address range provided in the lower layer I/O bus physical address range register 25.

If the transfer of the data is from the I/O bus 5a at the lower layer to the I/O bus 5d at the upper layer, the lower bus interface 22 responds to the request for transfer of the data in the I/O bus 5a at the lower layer, and stores the data transferred from the I/O bus 5a at the lower layer in the buffer 23. Then, the data are transferred to the I/O bus 5d at the upper layer via the upper bus interface 21. If the transfer of the data is from the I/O bus 5d at the upper layer to the I/O bus 5a at the lower layer, the upper bus interface 21 relays the request for transfer of the concerned address to the I/O bus 5d at the upper layer, and receives the transferring data from the I/O bus 5d at the upper layer. The data are stored in the buffer 24 once, and transferred to the I/O bus 5a at the lower layer via the lower bus interface 22. The I/O bus coupler 6a does not respond to a request for transfer for the physical address range provided in the lower layer I/O bus physical address range register 25.

Figure 4:
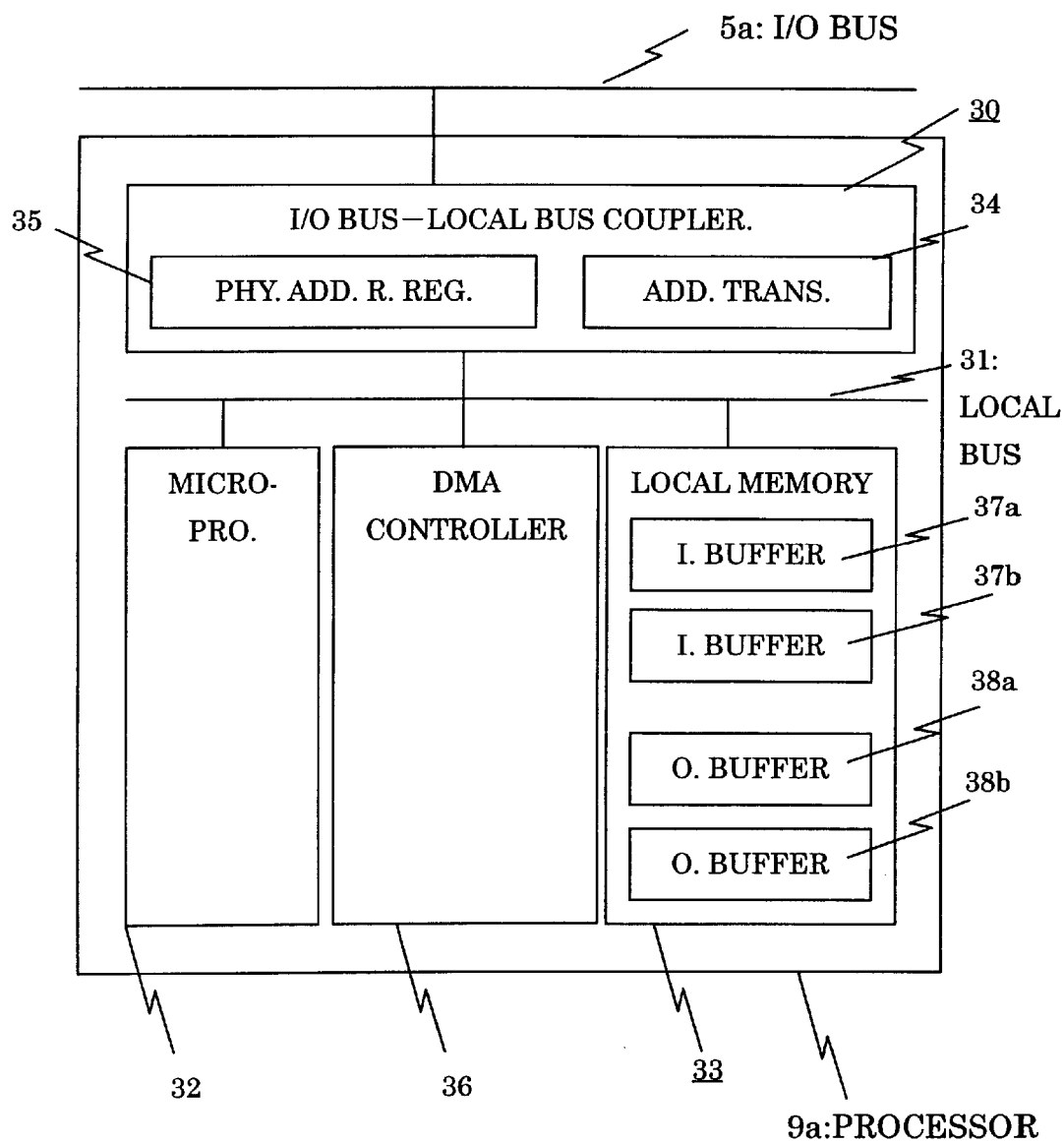
FIG. 4 shows a configuration chart of a processor in an embodiment of this invention.

FIG. 4 illustrates a configuration of the processor 9a according to this embodiment. Configuration of the processors 9b and 9c are the same as in FIG. 4.

In FIG. 4, the I/O bus 5a is illustrated. The processor 9a is connected to the I/O bus 5a. An I/O bus-local bus coupler 30 is provided for performing a data transfer between an I/O device or bus coupler connected to the I/O bus and a microprocessor 32, local memory 33 or DMA (Direct Memory Access) controller 36 connected to a local bus 31. The local bus 31 has a local address space different from the I/O bus 5a. The microprocessor 32 and the local memory 33 are also illustrated. The local memory 33 functions as a main memory of the microprocessor 32. An address translator 34 performs an address translation of the physical address in the I/O bus 5a and a local address in the local bus 31 for performing a data transfer between the I/O bus 5a and the local bus 31, which have different address spaces. A physical address range register 35 is also illustrated. A physical address range can be assigned to the processor 9a by providing the physical address range in the physical address range register 35. Input buffers 37a and 37b are provided in the local memory 33, and output buffer 38a and 38b are provided in the local memory 33.

Figure 5:
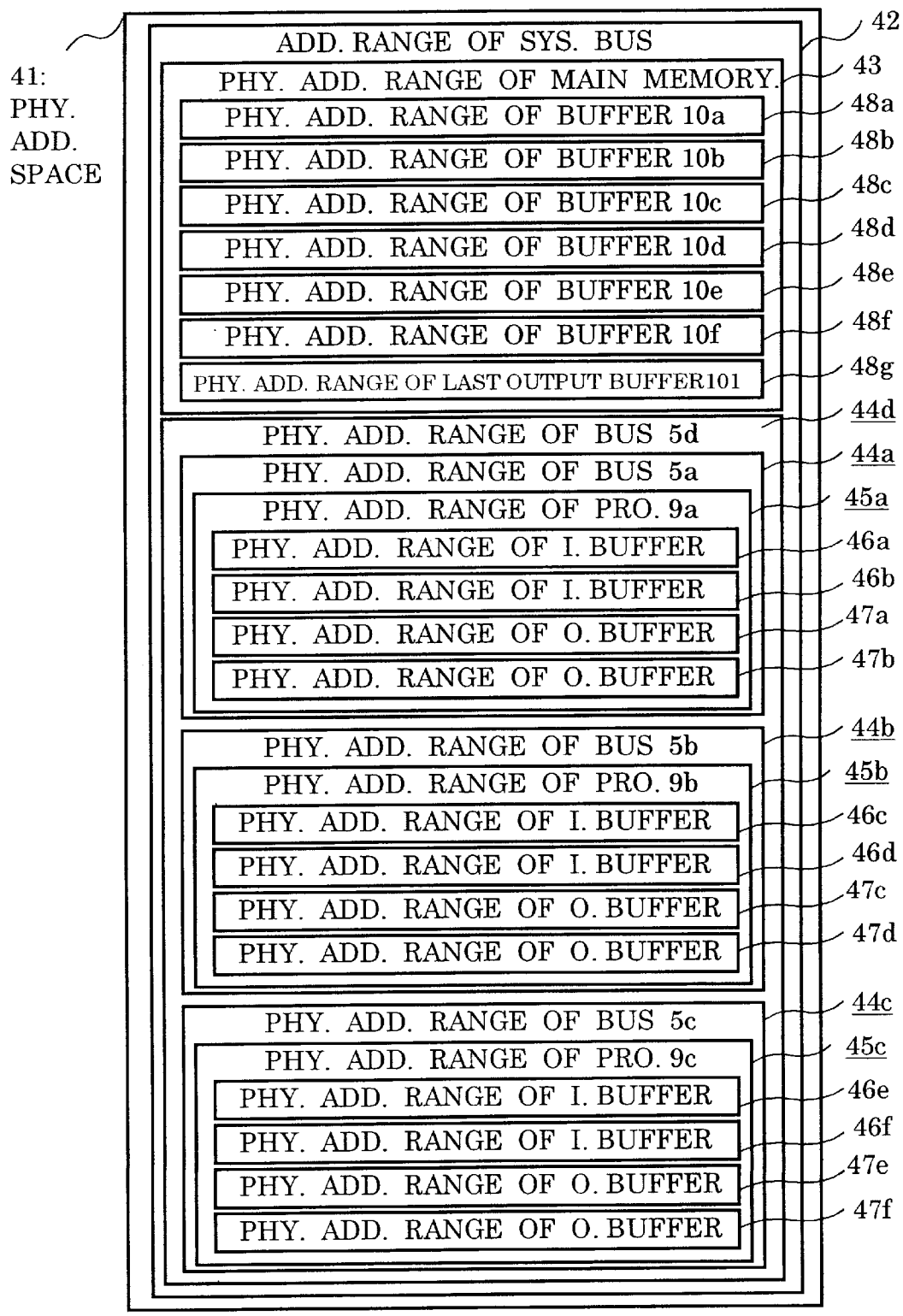
FIG. 5 illustrates an address distribution in a physical address space in and embodiment of this invention.

FIG. 5 illustrates an address distribution in a physical address space according to this embodiment.

A whole physical address space 41 is illustrated. A physical address range 42 in the physical address space is assigned to the system bus 3, and a physical address range 43 in the physical address space is assigned to the main memory 2.

In FIG. 5, a physical address range 44a in the physical address space is assigned to the I/O bus 5a. A physical address range 45a in the physical address range 44a of the I/O bus 5a is assigned to the processor 9a. Physical address ranges 46a and 46b in the physical address range 45a of the processor 9a are assigned to the input buffers 37a and 37b in the local memory 33. Physical address ranges 47a and 48b in the physical address range 45a of the processor 9a are assigned to the output buffer 38a and 38b in the local memory 33.

In FIG. 5, a physical address range 44b in the physical address space is assigned to the I/O bus 5b. A physical address range 45*b* in the physical address range 44*b* of the I/O bus 5*b* is assigned to the processor 9*b*. Physical address ranges 46*c* and 46*d* in the physical address range 45*b* of the processor 9*b* are assigned to the input buffers 37*a* and 37*b* in the local memory 33. Physical address ranges 47*c* and 47*d* in the physical address range 45*b* of the processor 9*b* are assigned to the output buffers 38*a* and 38*b* in the local memory 33.

In FIG. 5, a physical address range 44*c* in the physical address space is assigned to the I/O bus 5*c*. A physical address range 45*c* in the physical address range 44*c* of the I/O bus 5*c* is assigned to the processor 9*c*. Physical address ranges 46*e* and 46*f* in the physical address range 45*c* of the processor 9*c* are assigned to the input buffers 37*a* and 37*b* in the local memory 33. Physical address ranges 47*e* and 47*f* in the physical address range 45*c* of the processor 9*c* are assigned to the output buffers 38*a* and 38*b* in the local memory 33.

In FIG. 5, a physical address range 48*a* in a physical address range 43 of the main memory 2 is assigned to the buffer 10*a*. A physical address range 48*b* in the physical address range 43 of the main memory 2 is assigned to the buffer 10*b*. A physical address range 48*c* in the physical address range 43 of the main memory 2 is assigned to the buffer 10*c*. A physical address range 48*d* in the physical address range 43 of the main memory 2 is assigned to the buffer 10*d*. A physical address range 48*e* in the physical address range 43 of the main memory 2 is assigned to the buffer 10*e*. A physical address range 48*f* in the physical address range 43 of the main memory 2 is assigned to the buffer 10*f*. A physical address range 48*g* in the physical address range 43 of the main memory 2 is assigned to the last output buffer 101.

Figure 6:
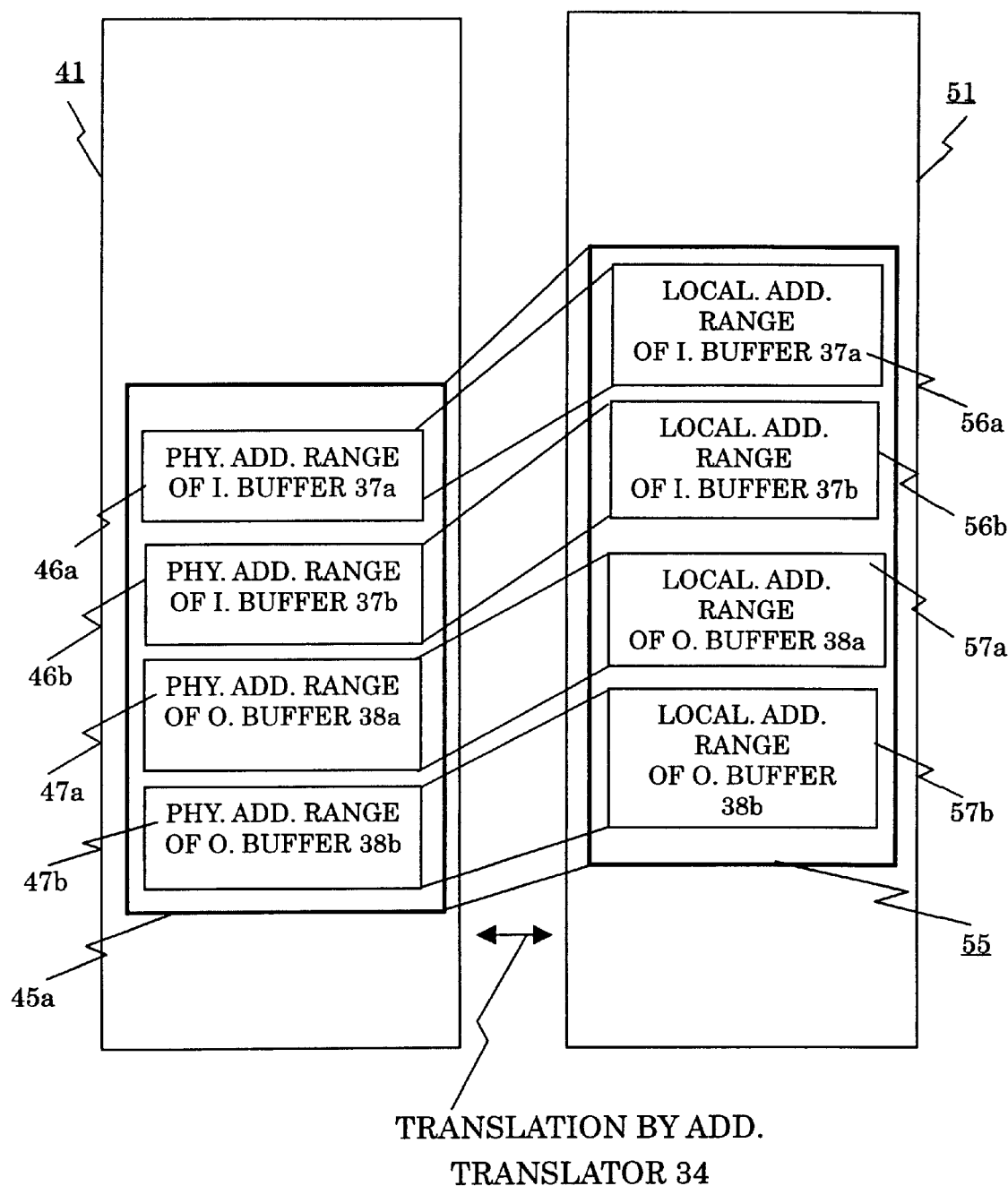
FIG. 6 illustrates an address translation by a processor in an embodiment of this invention.

FIG. 6 shows an address translation in the processor 9*a* according to this invention.

In FIG. 6, the physical address space 41 and the local address space 51 in the local bus 31 are illustrated. The physical address range 45*a* provided in the physical address range register 35 is translated to a local address range 55 by the address translator 34. Data in the input buffer 37*a* is in the physical address range 46*a* in the physical address space 41 of the I/O bus and in a local address range 56*a* in the local address space 51 of the local bus at the same time. Data in the input buffer 37*b* is in the physical address range 46*b* in the physical address space 41 of the I/O bus and in a local address range 56*b* in the local address space 51 of the local bus at the same time. Data in the output buffer 38*a* is in the physical address range 47*a* in the physical address space 41 of the I/O bus and in a local address range 57*a* in the local address space 51 of the local bus at the same time. Data in the output buffer 38*b* is in the physical address range 47*b* in the physical address space 41 of the I/O bus and in a local address range 57*b* in the local address space 51 of the local bus at the same time.

Figure 7:
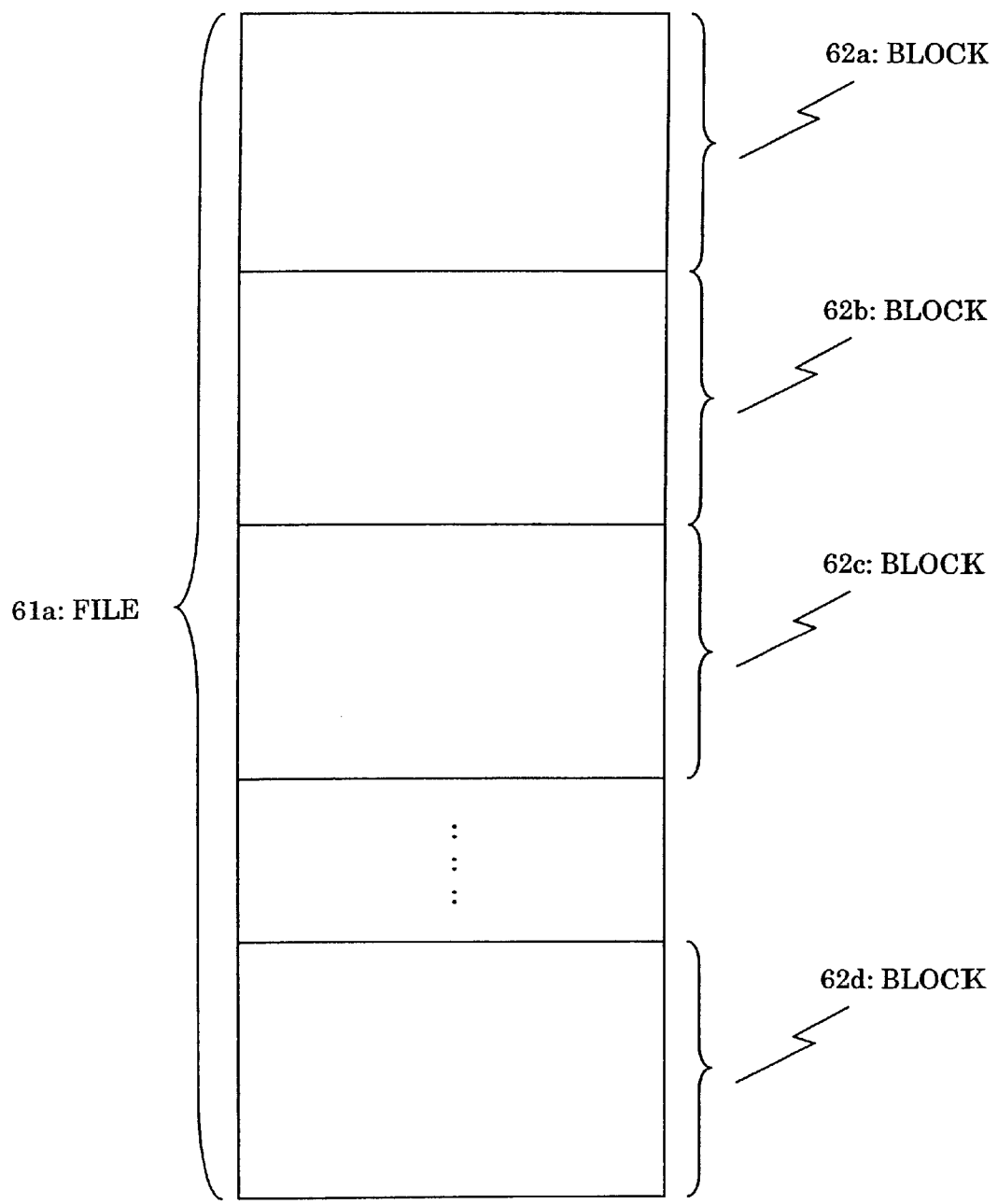
FIG. 7 illustrates a configuration of a file in an embodiment of this invention.

FIG. 7 illustrates a data format of the file 61*a* according to this embodiment. Formats of the files 61*b*–61*f* are the same as the file 61*a*.

The file 61*a* includes a plurality of blocks 62*a*–62*d*, etc. Sizes of the blocks 62*a*–62*d*, etc. and sizes of the input buffers 37*a* and 37*b* are all the same.

FIG. 8 illustrates a data format of the block 62*a* in the file 61*a* according to this embodiment. Formats of the blocks 62*b*–62*d*, etc. are the same as the block 62*a*.

In FIG. 8, the block 62*a* includes a plurality of records 63*a*–63*m*, etc. Each of the records 63*a*–63*m*, etc. includes data in a key field 64, numeric field 65, date field 66, etc.

Figure 9:
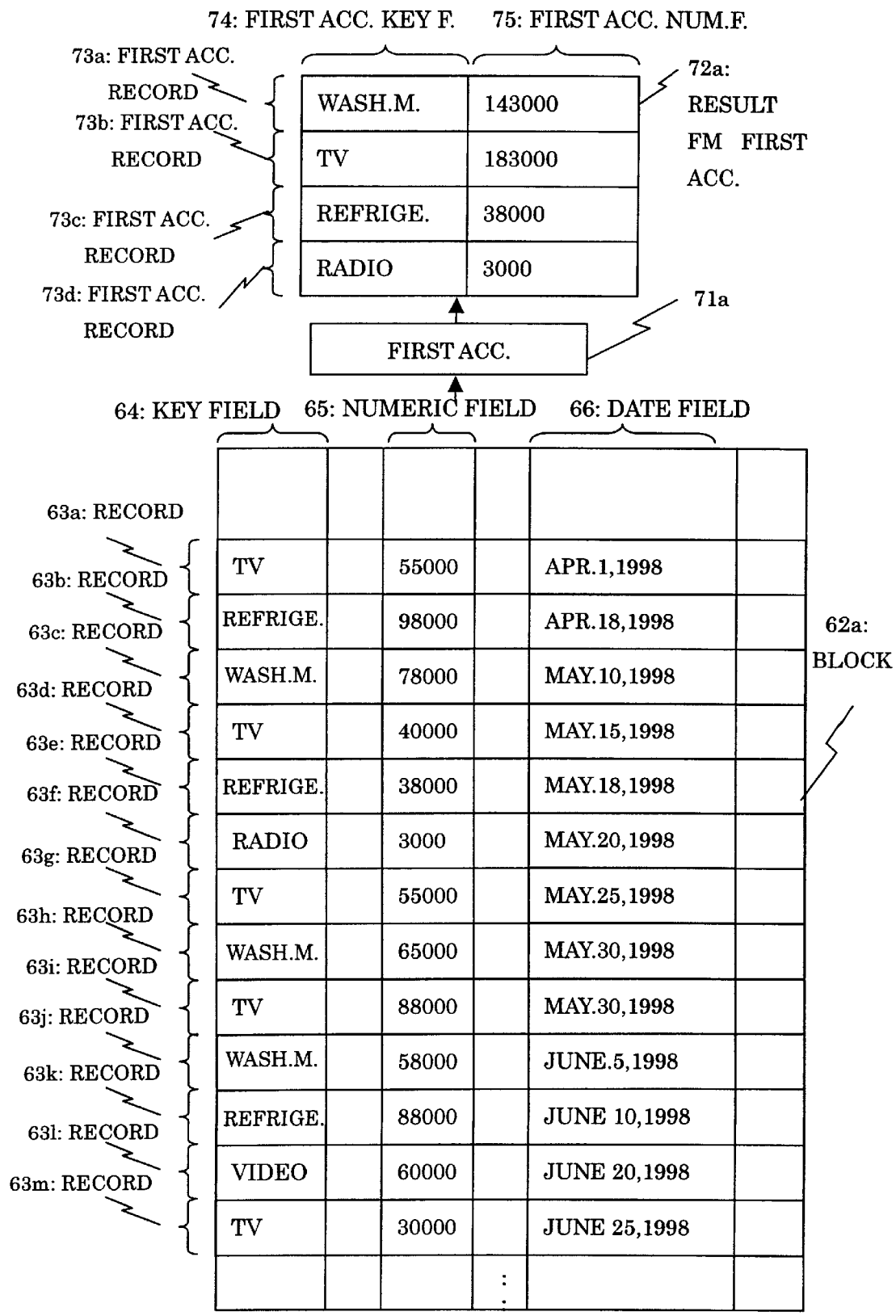
FIG. 9 illustrates a sample of a first accumulation and a result from the first accumulation in an embodiment of this invention.

FIG. 9 illustrates a sample of a first accumulation and a result from the first accumulation.

In FIG. 9, a first accumulation 71*a* and a result 72*a* from the first accumulation of the block 62*a* are illustrated. The result 72*a* from the first accumulation includes first accumulation records 73*a*–73*d*. Each of the first accumulation records 73*a*–73*d* includes data in a first accumulation key field 74 and a first accumulation numeric field 75. In this embodiment, data in the numeric field 65 with data in the date field 66 of May, 1998 are accumulated for each kind of data in the key field 64 in the first accumulation.

Figure 10:
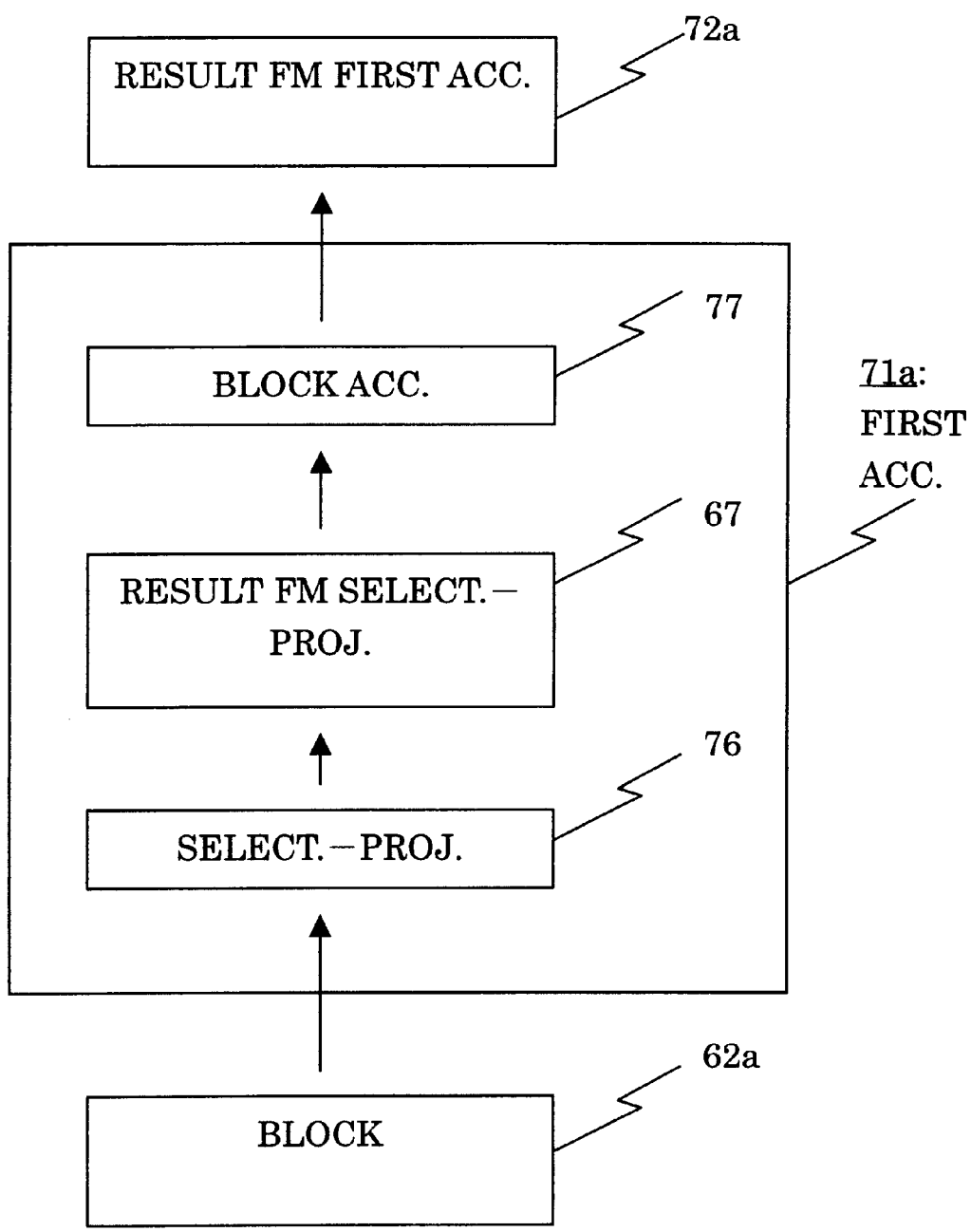
FIG. 10 illustrates an internal configuration in a first accumulation in an embodiment of this invention.

FIG. 10 illustrates operations in the first accumulation according to this embodiment.

In FIG. 10, the first accumulation 71*a* is illustrated. The block 62*a* is an input to the first accumulation 71*a*. The result 72*a* from the first accumulation 71*a* is an output from the first accumulation 71*a*. The first accumulation 71*a* includes steps of selection-projection 76 and block accumulation 77. A result 67 from the selection-projection 76 is an output from the selection—projection 76 and becomes an input to the block accumulation 77.

Figure 11:
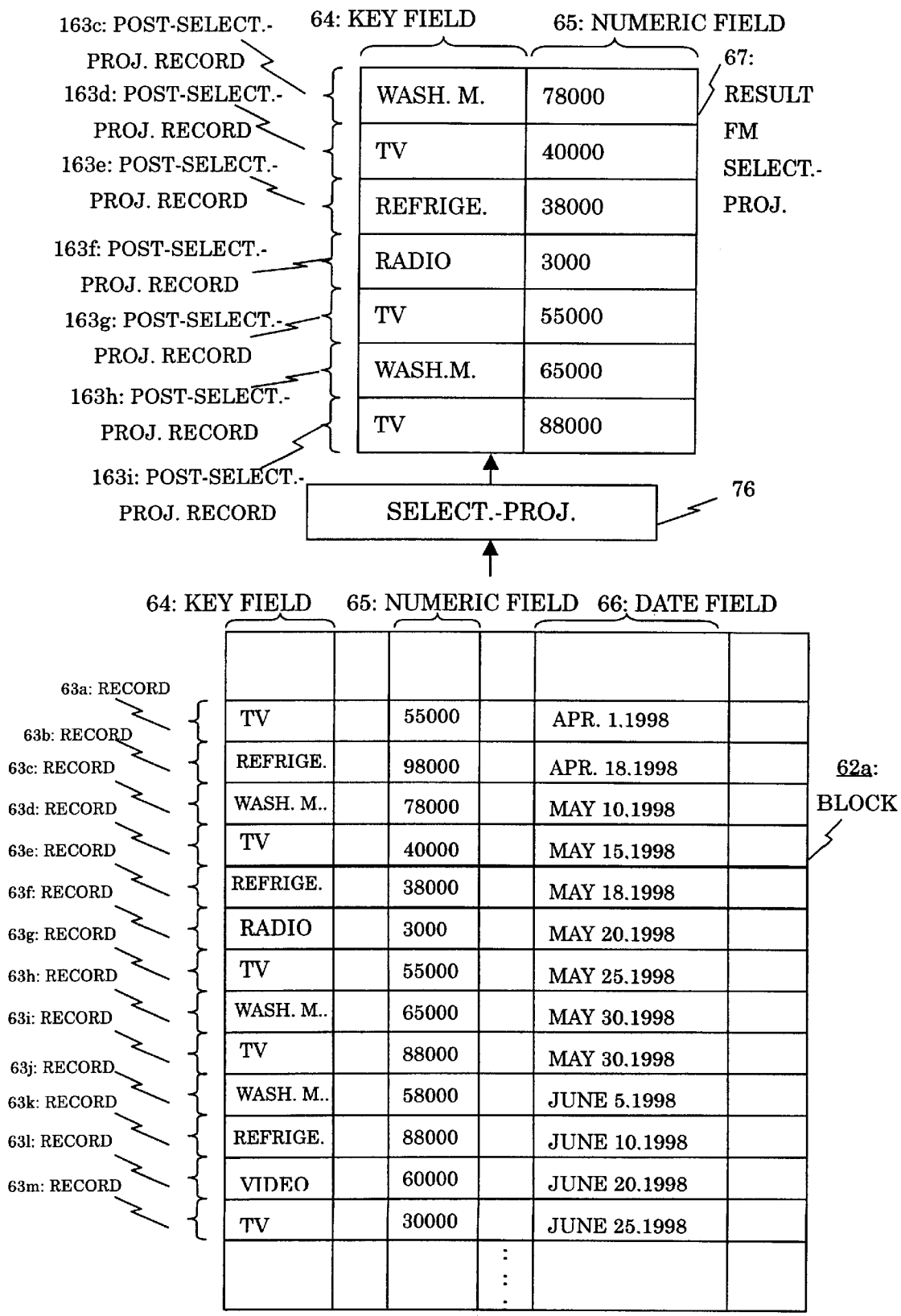
FIG. 11 illustrates a sample of a selection—projection processing and its result from the selection—projection processing in an embodiment of this invention.

FIG. 11 illustrates a sample of the selection-projection 76 and the result 67 from the selection-projection 76 according to this embodiment.

In FIG. 11, the selection-projection 76 and the result 67 from the selection-projection 76 of the block 62*a* are illustrated. Post-selection-projection records 163*c*–163*I* are illustrated. Each of the post-selection-projection records 163*c*–163*i* includes data in the key field 64 and the numeric field 65.

In this embodiment, records 63*c*–63*i* with data in the date field 66 of May 1998 are selected, and data in the key field 64 and numeric field 65 of the records 63*c*–63*i* are extracted or projected for generating the post-selection-projection records 163*c*–163*i* respectively. The post-selection-projection records 163*c*–163*i* are the result 67 from the selection-projection.

FIG. 12 illustrates a sample of the block accumulation 77 and its result 72*a* from the first accumulation according to this embodiment.

In FIG. 12, the block accumulation 77 and the result 72*a* from the first accumulation, i.e., the result 72*a* from the block accumulation 77 of the result 67 from the selection-projection, are illustrated. In the block accumulation 77, data in the numeric field of records are accumulated for each kind of data in the key field 65, and the first accumulation records 73*a*–73*d* are generated. In FIG. 12, the first accumulation record 73*a* is generated from the post-selection-projection records 163*c* and 163*h*, the first accumulation record 73*b* is generated from the post-selection projection records 163*d*, 163*g*, and 163*i*, the first accumulation record 73*c* is generated from the post-selection-projection record 163*e*, and the first accumulation record 73*d* is generated from the post-selection-projection record 163*f*.

Figure 13:
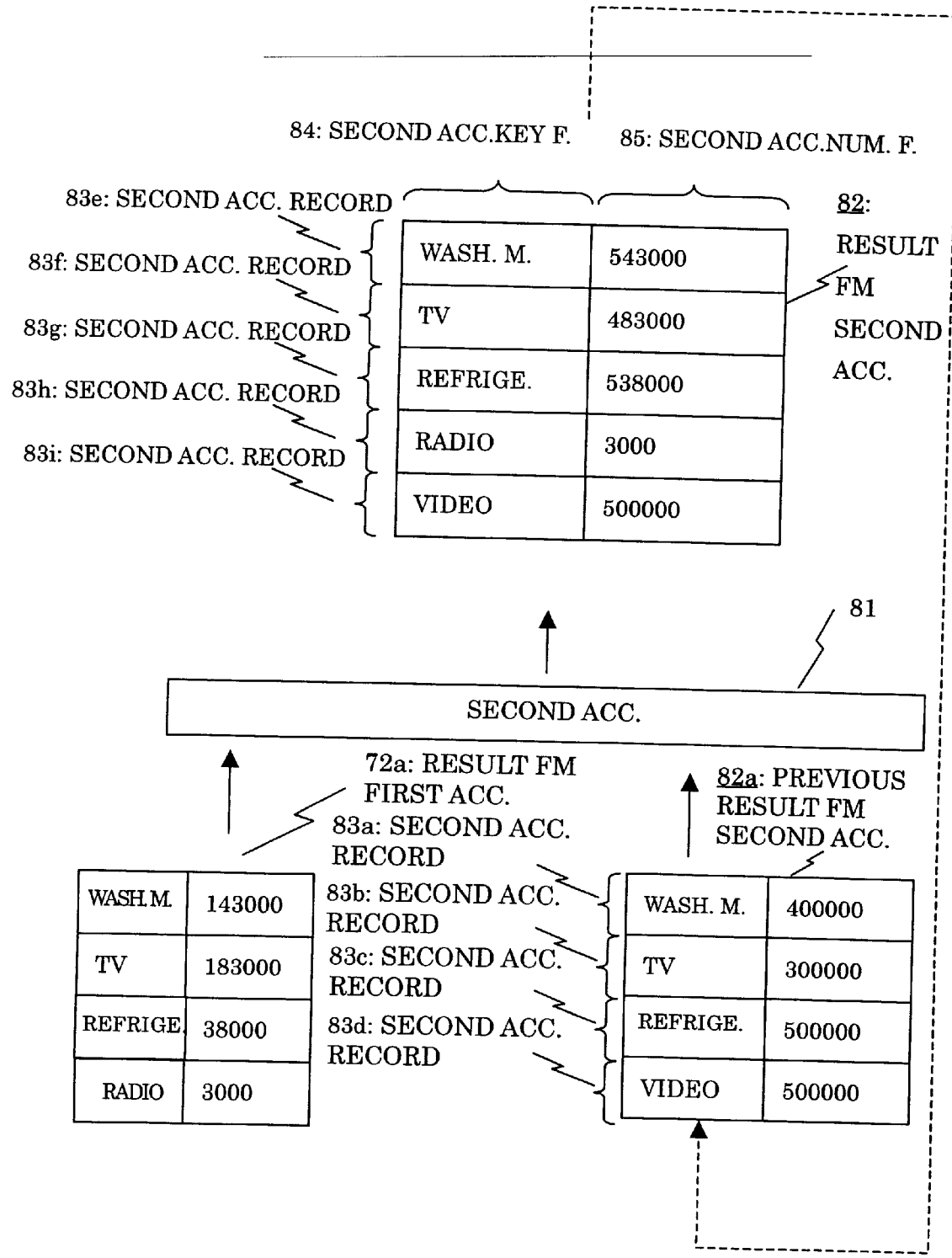
FIG. 13 illustrates a sample of a second accumulation and its result from the second accumulation in an embodiment of this invention.

FIG. 13 illustrates a sample of a second accumulation 81 and a result 82 from the second accumulation 81 according to this embodiment.

In FIG. 13, the result 72*a* from the first accumulation and a previous result 82*a* from the second accumulation 81 are illustrated. The result 82 from the second accumulation of the result 72*a* from the first accumulation and the previous result 82*a* from the second accumulation 81 is illustrated. The previous result 82*a* from the second accumulation includes second accumulation records 83*a*–83*d*, and the result 82 from the second accumulation includes second accumulation records 83e–83i. Each of the second accumulation records 83a–83d and 83e–83i includes data in a second accumulation key field 84 and a second accumulation numeric field 85.

Figure 14:
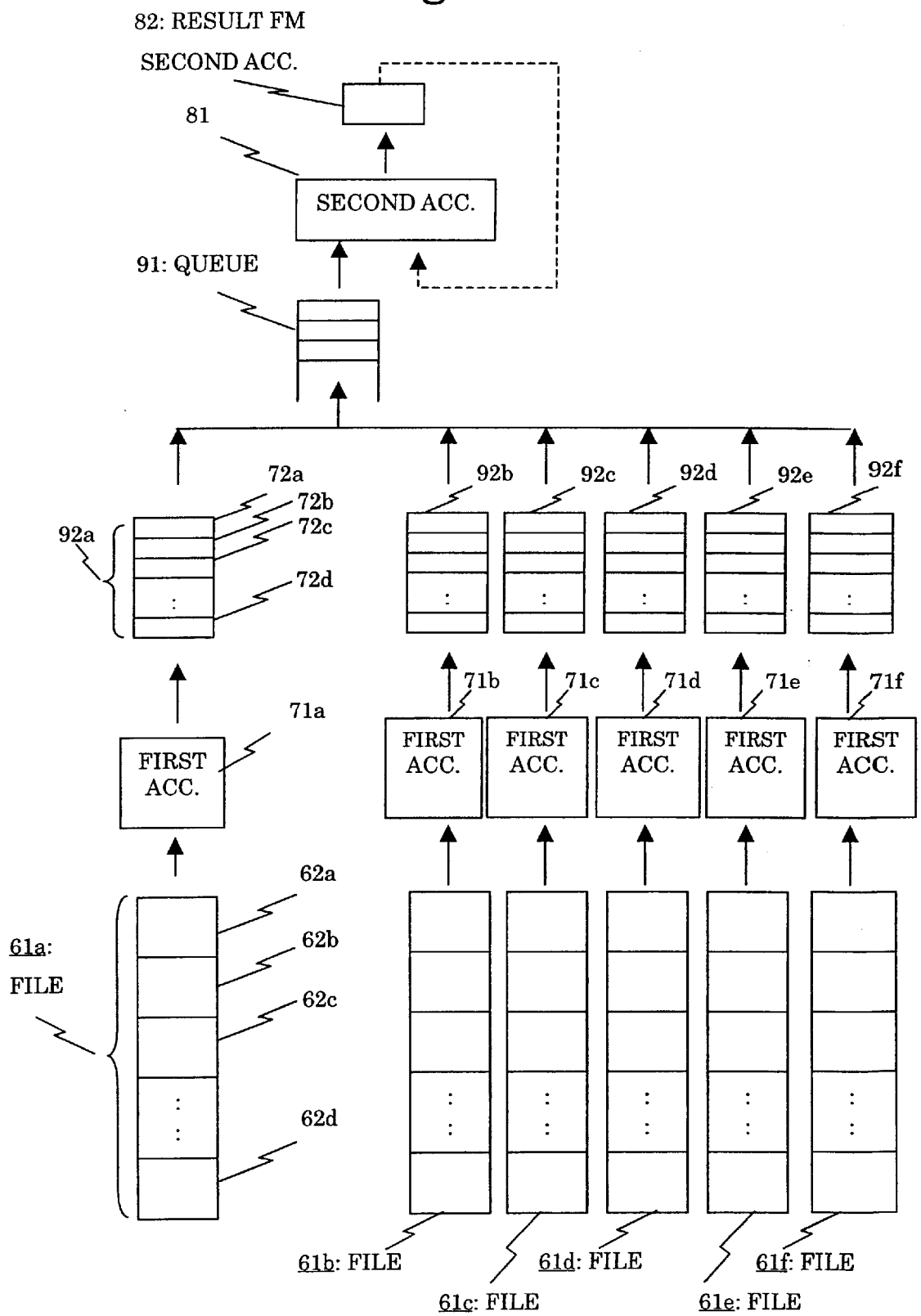
FIG. 14 illustrates an accumulation processing in an embodiment of this invention.

FIG. 14 illustrates a sample of an accumulation processing according to this embodiment.

In FIG. 14, files 61a–61f include blocks 62a–62d, etc. First accumulations 71a–71f of the files 61a–61f are illustrated. The first accumulations 71a and 71b are performed by the processor 9a, the first accumulations 71c and 71d are performed by the processor 9b, and the first accumulation 71e and 71f are performed by the processor 9c. The results 72a–72d, etc. from the first accumulation 71a of the blocks 62a–62d, etc. are obtained. The results from the same first accumulation, e.g., 72a–72d, etc. are generally called as a first accumulation result sequence. First accumulation result sequences 92a–92f are sets of the results from the first accumulations 71a–71f. A queue 91 for the result from the first accumulation is also illustrated. The second accumulation 81 and the result 82 from the second accumulation 81 are also illustrated.

Figure 15:
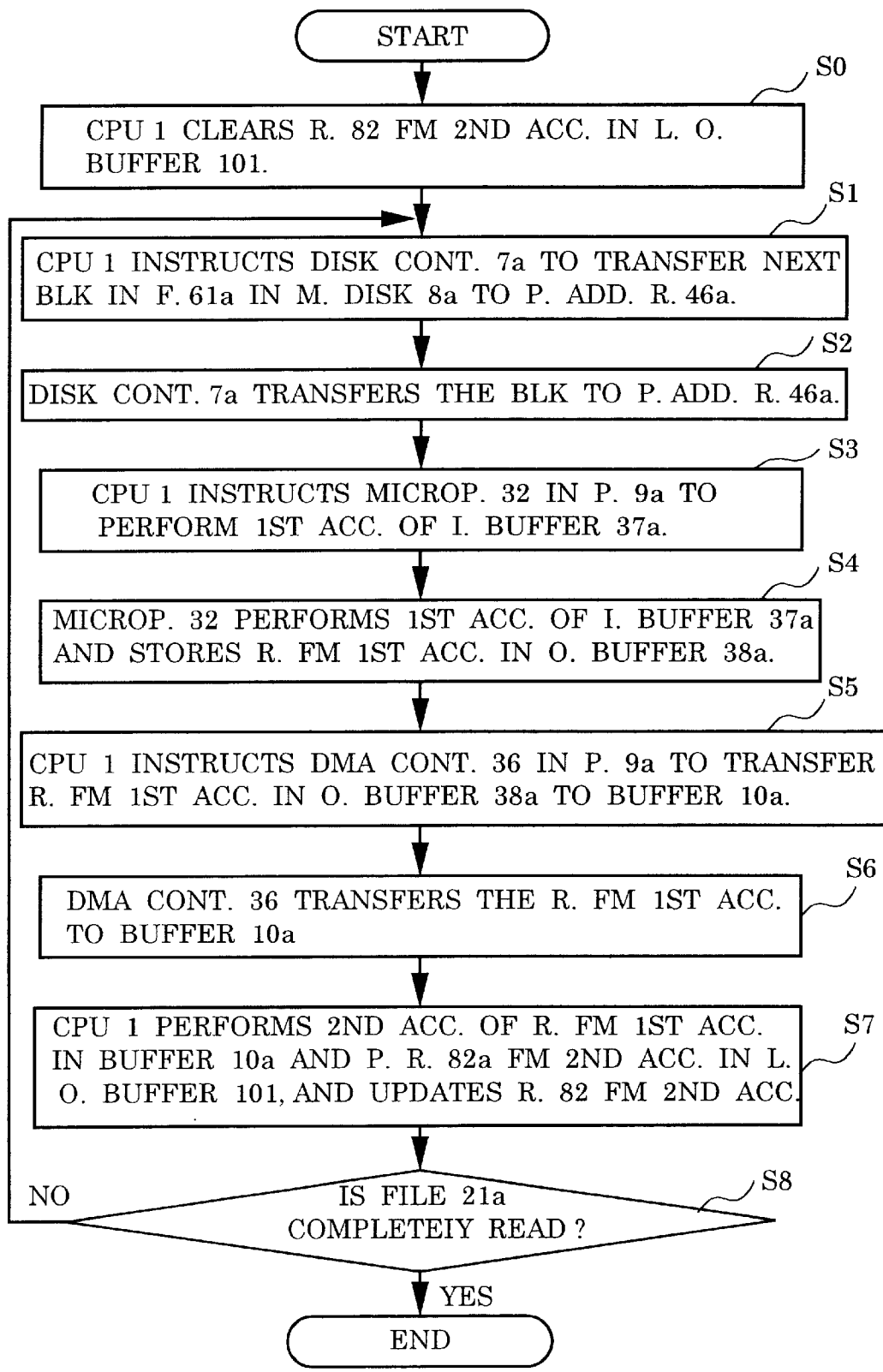
FIG. 15 shows a flow chart of operations in an embodiment of this invention.

FIG. 15 shows a flow chart of operation of an accumulation processing according to this embodiment. The operations are shown in steps S0–S8.

Operations are explained.

For a purpose of explanation of this embodiment, data in the numeric field 65 are accumulated for each kind data in the key field 64 in the files 61a–61f stored in the magnetic disk drives 8a–8f, and the result 82 from the second accumulation is obtained as a final processing result.

The CPU 1 provides the physical address range 44a in the lower layer I/O bus physical address range register 25 in the I/O bus coupler 6a at a time of initializing a system. The CPU 1 also provides the physical address range 44b in the lower layer I/O bus physical address range register 25 in the I/O bus coupler 6b and the physical address range 44c in the lower layer I/O bus physical address range register 25 in the I/O bus coupler 6c.

The CPU 1 also provides the physical address range 44d in the I/O bus physical address range register 15 in the system bus-I/O bus coupler 4 at the time of initializing the system.

The CPU 1 also provides the physical address range 45a in the physical address range register 35 in the processor 9a at the time of initializing the system. The CPU 1 also provides the physical address range 45b in the physical address range register 35 in the processor 9b and the physical address range 45c in the physical address range register 35 in the processor 9c.

By providing these addresses, the hierarchical bus as illustrated in FIG. 1 is initialized to have the physical address ranges as illustrated in FIG. 5.

Then, the accumulation operations are performed as shown in FIG. 15. The CPU 1 clears the result 82 from the second accumulation in the last output buffer 101. By doing so, no second accumulation record is included in the result 82 from the second accumulation (step S0).

Then, the CPU 1 instructs the disk controller 7a to transfer data in a first block of the file 61a in the magnetic disk drive 8a to the physical address range 46a (step S1). The disk controller 7a reads the data from the file 61a in the magnetic disk drive 8a, and issues a request for transfer of the data to the physical address range 46a to the I/O bus 5a. Since the physical address range 46a is provided in the physical address range register 35 in the I/O bus-local bus coupler 30 in the processor 9a, the I/O bus-local bus coupler 30 in the processor 9a responds to the request, and the data are transferred from the disk controller 7a to the processor 9a. When the data are transferred to the processor 9a, the data are stored in the input buffer 37a in the local memory 33 (step S2).

Since the physical address range 46a is included in the physical address range provided in the lower bus address range register in the I/O bus coupler 6a, the I/O bus coupler 6a does not respond to the request for transfer from the disk controller 7a.

Since the data in the input buffer 37a has the local address range 56 in the local address of the microprocessor 32, the microprocessor 32 can operate the data directly.

After the data transfer, the CPU 1 instructs the microprocessor 32 in the processor 9a to perform the first accumulation of the data in the input buffer 37a after (step S3).

The microprocessor 32 performs the first accumulation of the data in the input buffer 37a, and outputs the result from the first accumulation to the output buffer 38a (step S4).

When the block 62a as illustrated in FIG. 8 is transferred, the result 72a from the first accumulation as illustrated in FIG. 9 is stored in the output buffer 38a. Since a plurality of records with same data in the key field 64 is in the block 62a generally, the size of the result 72a from the first accumulation is reduced from the size of the block 62a.

When the first accumulation is completed, the CPU 1 starts the DMA (Direct Memory Access) controller 36 in the processor 9a, and transfers the result 72a from the first accumulation in the output buffer 38a to the buffer 10a in the main memory 2 (step S5). In this transfer, only data in the size of the result 72a from the first accumulation is transferred. It is not necessary to transfer all the data in the output buffer 38a.

The DMA controller 36 sends a request for data transfer through the I/O bus 5a to the destination in the physical address range 48a in the buffer 10a in the main memory 2 (step S6). Since the physical address range 44a is provided in the lower layer I/O bus physical address range register 25 in the I/O bus coupler 6a and the physical address range 48a in the buffer 10a is not included in the physical address range 44a, the lower bus interface 22 in the I/O bus coupler 6a responds to the request for transfer, and stores the transferred data in the buffer 23.

The I/O bus coupler 6a sends a request for data transfer to the I/O bus 5d, to the destination in the physical address range 48a in the buffer 10a in the main memory 2. Since the physical address range 44d is provided in the I/O bus physical address range register 15 in the system bus-I/O bus coupler 4 and the physical address range 48a in the buffer 10a is not included in the physical address range 44d, the I/O bus interface 12 in the system bus-I/O bus coupler 4 responds to the request for transfer, and stores the transferred data in the buffer 13.

The system bus-I/O bus coupler 4 sends a request for transfer through the system bus 3 to the destination in the physical address range 48a in the buffer 10a in the main memory 2. Since the physical address range 48a is included in the physical address range 43 of the main memory 2, the main memory 2 responds to the request for transfer, and stores the transferred data in the physical address range 48a in the buffer 10a.

The CPU 1 performs a second accumulation of the result from the first accumulation in the buffer 10a and the previous result 82a from the second accumulation in the last output buffer 101, and updates the previous result 82a from the second accumulation to the result 82 from the second accumulation (step S7).

The CPU 1 performs the operations in steps S1–S7 for each of the blocks 62a–62d, etc. in the file 61a (step S8).

The operations in FIG. 15 are also performed for the file 61b, magnetic disk drive 8b, disk controller 7b, I/O bus 5a, processor 9a, I/O buffer 37b, output buffer 38b, and buffer 10b.

In this case, the file 61a, magnetic disk drive 8a, disk controller 7a, input buffer 37a, and output buffer 38a in FIG. 15 are replaced by the file 61b, magnetic disk drive 8b, disk controller 7b, input buffer 37b, and output buffer 38b. These operations can be performed in parallel with the operations shown in FIG. 15 through exclusive control in the queue 91.

The operations in FIG. 15 are also performed for the file 61c, magnetic disk drive 8c, disk controller 7c, I/O bus 5b, processor 9b, and buffer 10c.

In this case, the file 61a, magnetic disk drive 8a, disk controller 7a, I/O bus 5a, and processor 9a are replaced by the file 61c, magnetic disk drive 8c, disk controller 7c, I/O bus 5b, and processor 9b. These operations can be performed in parallel with the operations shown in FIG. 15 through exclusive control in the queue 91.

The operations in FIG. 15 are also performed for the file 61d, magnetic disk drive 8d, disk controller 7d, I/O bus 5b, processor 9b, input buffer 37b, output buffer 38b, and buffer 10d.

In this case, the file 61a, magnetic disk drive 8a, disk controller 7a, I/O bus 5a, processor 9a, input buffer 37a, and output buffer 38a are replaced by the file 61d, magnetic disk drive 8d, disk controller 7d, I/O bus 5b, processor 9b, input buffer 37b, and output buffer 38b. These operations can be performed in parallel with the operations shown in FIG. 15 through an exclusive control in the queue 91.

The operations in FIG. 15 are also performed for the file 61e, magnetic disk drive 8e, disk controller 7e, I/O bus 5c, processor 9c, and buffer 10e.

In this case, the file 61a, magnetic disk drive 8a, disk controller 7a, I/O bus 5a, and processor 9a are replaced by the file 61e, magnetic disk drive 8e, disk controller 7e, I/O bus 5c, and processor 9c. These operations can be performed in parallel with the operations shown in FIG. 15 through an exclusive control in the queue 91.

The operations in FIG. 15 are also performed for the file 61f, magnetic disk drive 8f, disk controller 7f, I/O bus 5c, processor 9c, input buffer 37b, output buffer 38b, and buffer 10f.

In this case, the file 61a, magnetic disk drive 8a, disk controller 7a, I/O bus 5a, processor 9a, input buffer 37a, and output buffer 38a are replaced by the file 61f, magnetic disk drive 8f, disk controller 7f, I/O bus 5c, processor 9c, input buffer 37b, and output buffer 38b. These operations can be performed in parallel with the operations shown in FIG. 15 through exclusive control in the queue 91.

Generally, the sizes of the results 72a–72d from the first accumulations are respectively smaller than the sizes of the blocks 62a 62d. Therefore, the quantity of data transferred to the buffers 10a–10f in the main memory by the DMA transfer according to this embodiment is smaller than the quantity of the data transferred when the blocks 62a–62d are transferred directly. As the result, the sizes of the first accumulation result sequences 92a–92f are respectively smaller than the sizes of the files 61a–61f. Therefore, the quantity of data transferred to the I/O bus 5d, system bus-I/O bus coupler 4, system bus 3, and main memory 2 is smaller than the quantity of data transferred when all the blocks in the files 61a–61f are transferred to the main memory 2 before processing. The quantity of data processed by the CPU is also smaller than the quantity of data transferred when all the blocks in the files 61a–61f are transferred to the main memory 2 before processing.

As stated, according to this embodiment, when more devices are connected by the hierarchical bus, the ability of data transfer and the speed of data processing can be improved accordingly.

Embodiment 2

In embodiment 1, the processors 9a–9c are only connected to the I/O buses 5a–5c. However, the processors 9a–9c can be unified with the I/O bus couplers 6a–6c, and the same effect as in embodiment 1 can be realized.

Figure 16:
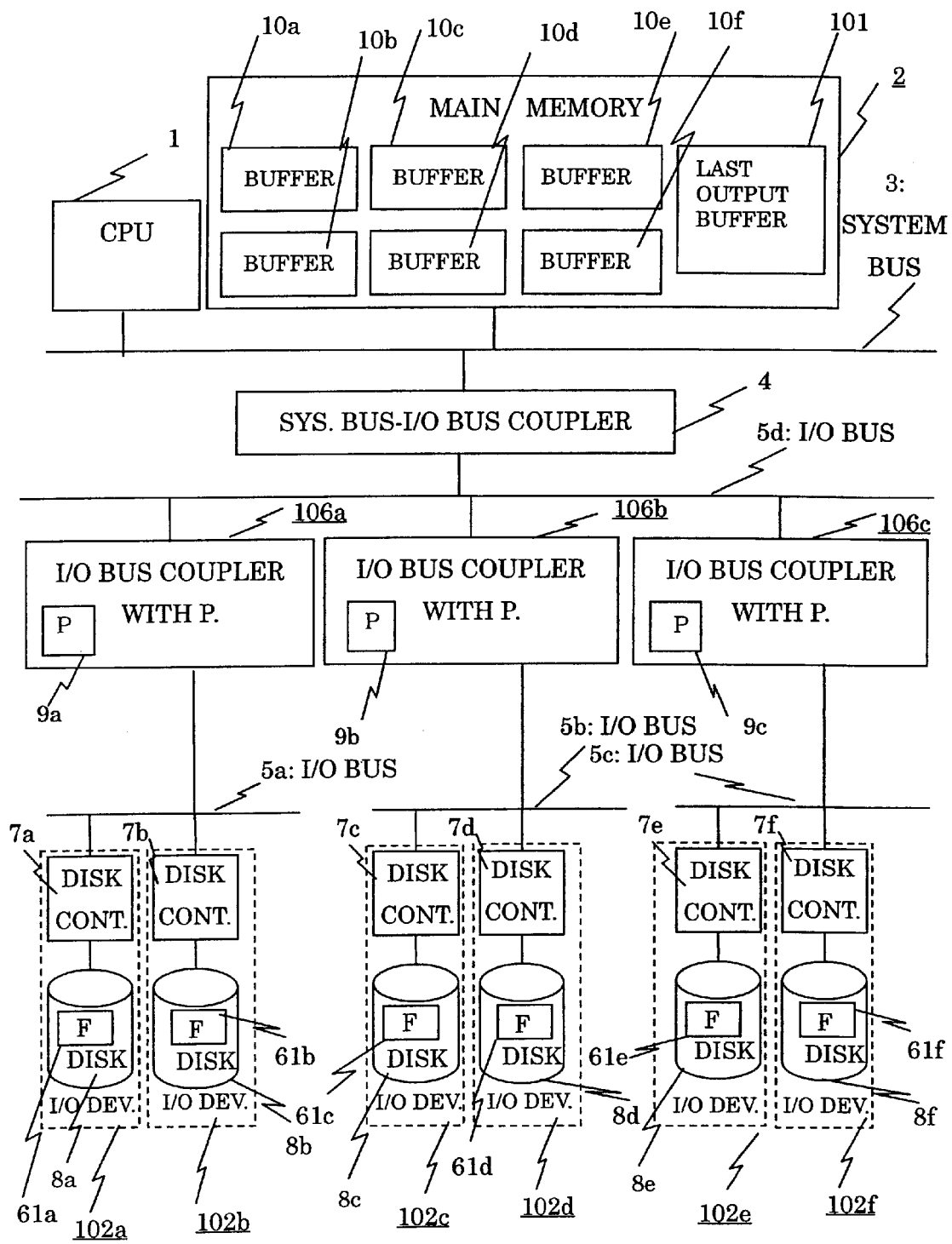
FIG. 16 shows a system configuration chart in another embodiment of this invention.

FIG. 16 illustrates a configuration of a system for realizing embodiment 2 according to this invention.

In FIG. 16, the CPU 1, main memory 2, system bus 3, system bus-I/O bus coupler 4, I/O buses 5a–5d, disk controllers 7a–7f, disk drives 8a–8e, and files 61a–61f are illustrated. Each of the units has the same functions with a corresponding unit in embodiment 1. I/O bus couplers 106a–106c with processors and the processors 9a–9c are also illustrated. The processors 9a–9c are included in the I/O bus couplers 106a–106c respectively.

Figure 17:
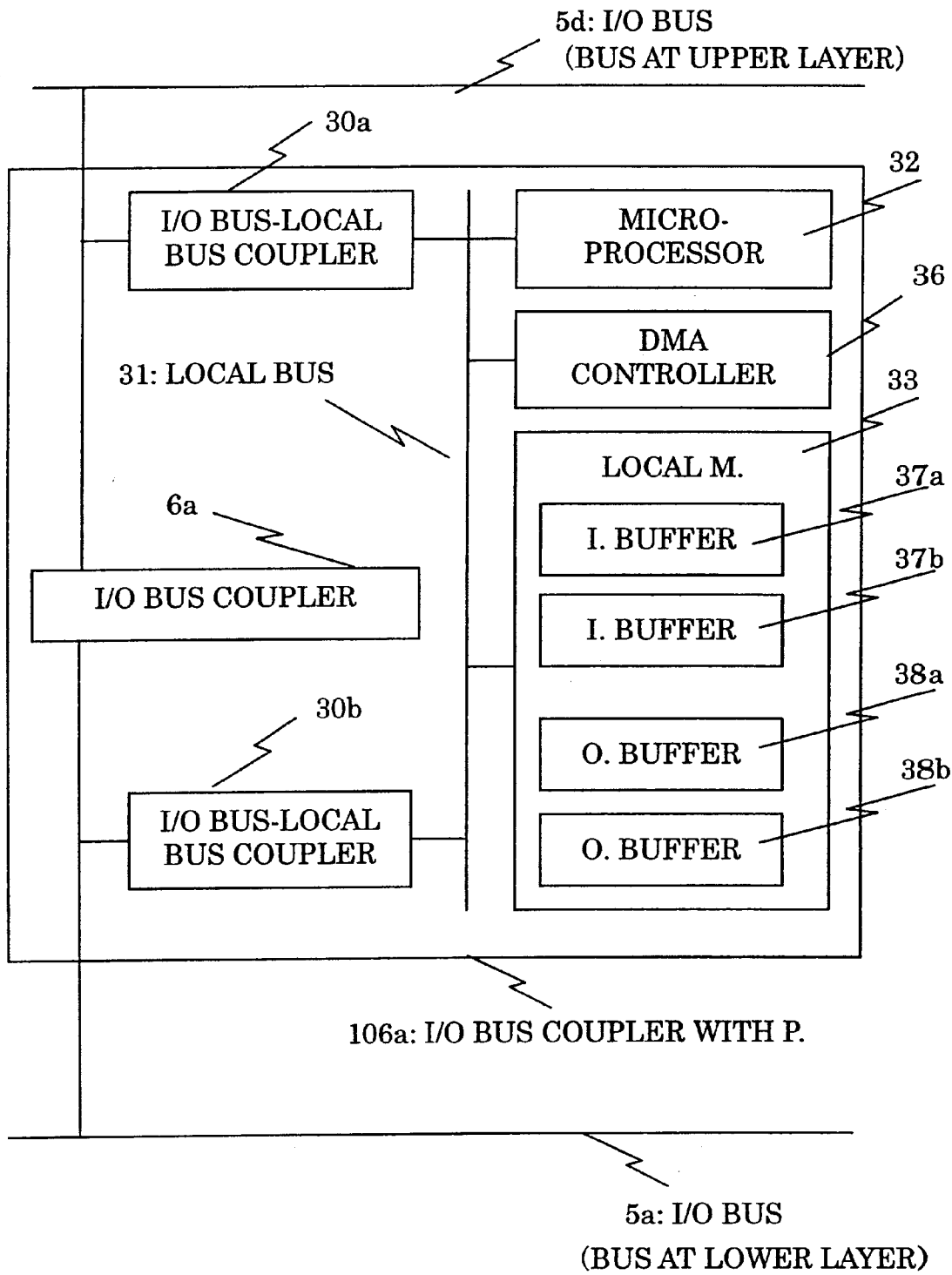
FIG. 17 shows a configuration chart of an I/O bus coupler with a processor in another embodiment of this invention.

FIG. 17 illustrates a configuration of the I/O bus coupler 106a with the processor according to this embodiment. The configuration of the I/O bus couplers 106b and 106c the same as in FIG. 17.

In FIG. 17, the I/O bus 5d at the upper layer, the I/O bus 5a at the lower layer, and the I/O bus coupler 106a with the processor are illustrated. The I/O bus coupler 6a is provided in the I/O bus coupler 106a with the processor. The configuration of the I/O bus coupler 6a is thee same as in FIG. 3, embodiment 1. I/O bus-local bus couplers 30a and 30b are provided in the I/O bus coupler 106a with the processor. The configuration of the I/O bus-local bus couplers 30a and 30b is the same as in FIG. 4, embodiment 1. The local bus 31, microprocessor 32, local memory 33, DMA controller 36, input buffers 37a and 37b in the local memory, and output buffers 38a and 38b in the local memory are also illustrated.

The operations in embodiment 2 are almost same as the operations in embodiment 1. The difference from embodiment 1 is described.

In embodiment 1, the result from the first accumulation in the output buffers 38a and 38b in the processors 9a–9c are transferred to the buffers 10a–10f in the main memory 2 via the I/O bus couplers 6a–6c by the DMA transfer. However, in embodiment 2, since the local bus 31 connected to the local memory 33 is connected to the I/O bus 5a at the upper layer via the I/O bus-local bus coupler 30a in FIG. 17, the data are transferred via the I/O bus—local bus coupler 30a instead of the I/O bus coupler 6a. Other operations and controls are same as in embodiment 1.

Embodiment 3

In embodiment 1, the data are processed by the processor at the same layer in the hierarchical bus, and sent to the CPU. However, the data can also sent to a processor at a different layer, if necessary.

Figure 18:
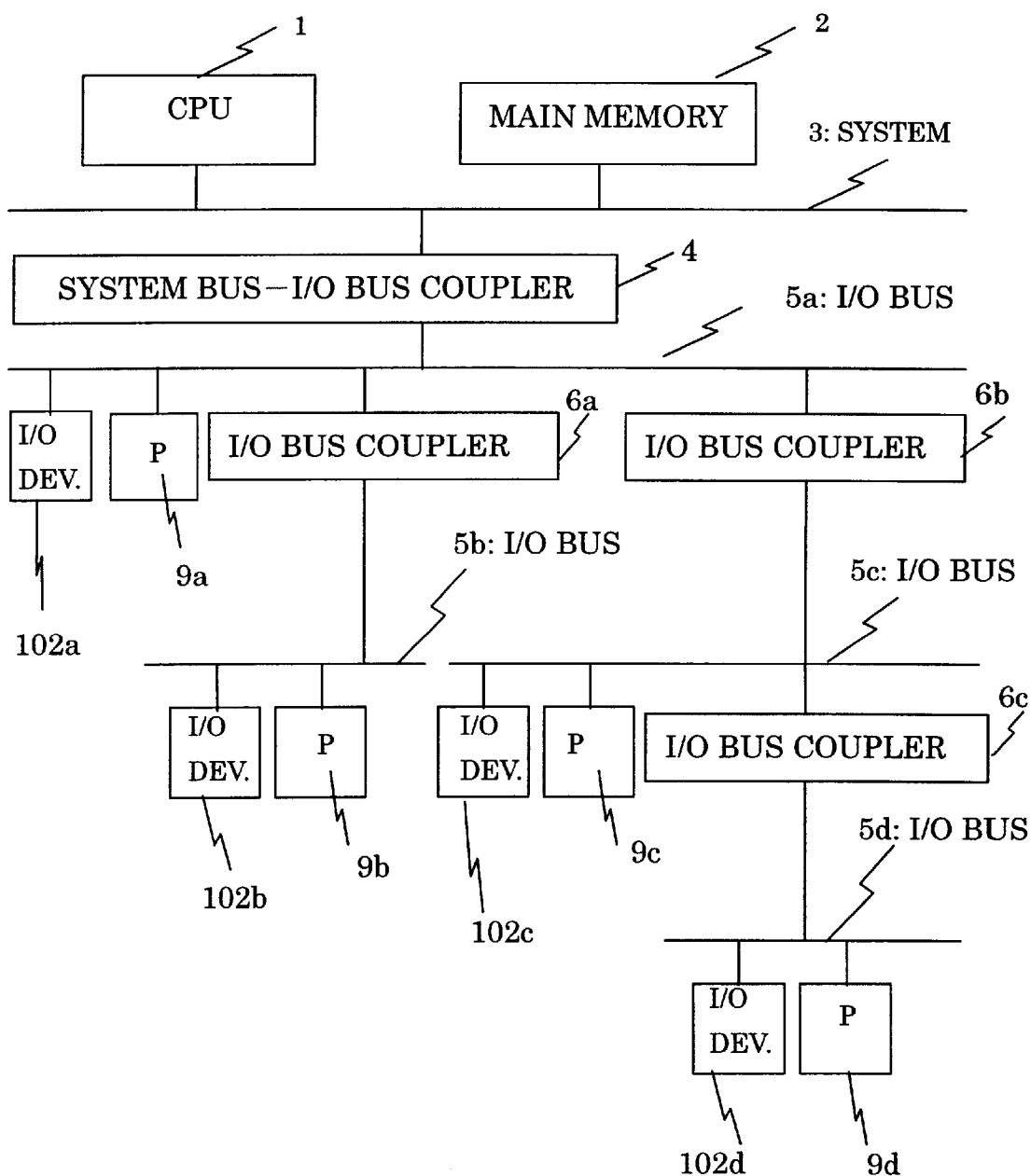
FIG. 18 shows a system configuration chart in another embodiment of this invention.

FIG. 18 illustrates a configuration of the system according to embodiment 3.

In FIG. 18, the CPU 1, main memory 2, system bus 3, system bus-I/O bus coupler 4, I/O buses 5a–5d, I/O bus couplers 6a–6c, processors 9a–9d, and I/O devices 102a–102d are illustrated. Since locations of the buffers in the main memory 2 and internal configuration of the I/O devices 102a–102d are same as in embodiment 1, the illustrations are omitted in FIG. 18.

In embodiment 1, data from an I/O device connected to an I/O bus is transferred to an processor connected to the same I/O bus for processing. However, the data can be transferred to a processor which is not connected the same I/O bus. In FIG. 18, data from the I/O device 102a connected to a bus can be transferred to processors 9b–9d connected to different I/O buses instead of the processor 9a. The data from the I/O devices 102b–102d can be processed by any one of the processors 9a–9d.

Embodiment 4

In embodiment 1, the data from the I/O device is transferred to the determined processor corresponding to the I/O device for processing. However, the data inputted from the I/O device can be transferred to a plurality of processors in a unit of blocks. It is also possible to send a part of the blocks to a buffer in the main memory for performing the first accumulation by the CPU.

A configuration of the system according to embodiment 4 is same as embodiment 3 in FIG. 18.

Figure 19:
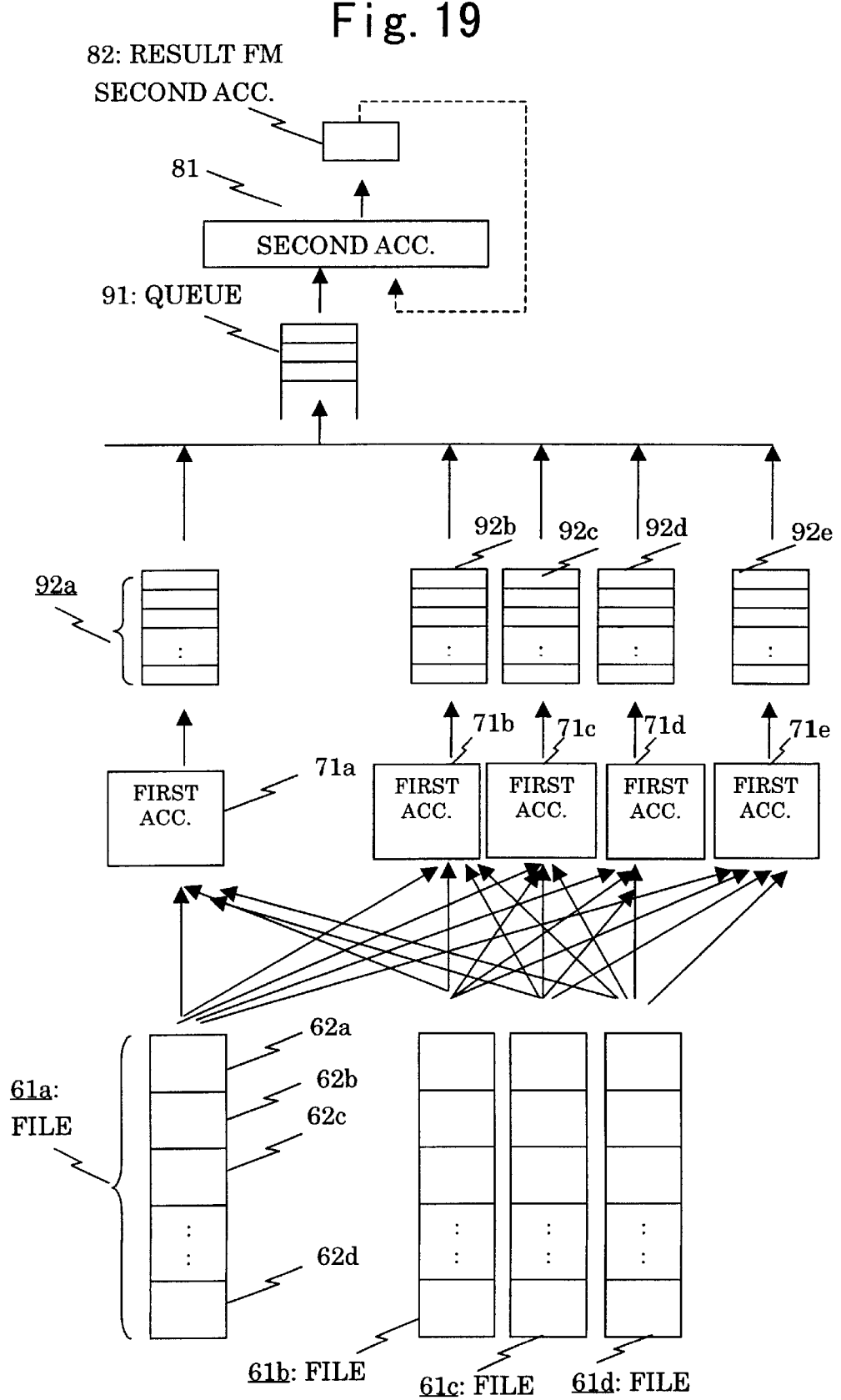
FIG. 19 illustrates an accumulation processing in another embodiment of this invention.

FIG. 19 illustrates an accumulation processing according to embodiment 4.

In FIG. 19, the files 61a–61d are stored in the magnetic disk drives in the I/O devices 102a–102d. The first accumulations 71a–71d are also illustrated. The first accumulations 71a–71d are assumed to be performed by the processors 9a–9d respectively. The first accumulation 71e is assumed to be performed by the CPU 1. The second accumulation 81 is assumed to be performed by the CPU 1.

Operations are explained.

In embodiment 4, the data in the file 61a can be processed in the first accumulations 71a–71e by any processor or CPU in the unit of blocks 62a–62d, etc.

For example, the block 62a can be transferred to the processor 9a for the first accumulation 71a, or to the processor 9b for the first accumulation 71b, or to the processor 9c for the first accumulation 71c, or to the processor 9d for the first accumulation 71d. Or, the block 62a can be transferred to the main memory 2 for the first accumulation 71e by the CPU. The destination for transfer can be selected for each of the blocks 62b, 62c, etc. arbitrarily, and the first accumulation of the blocks can be performed by the different processors or CPU.

In embodiment 4, blocks in any file can be transferred to any processor. However, it is also possible to restrict destination processors based on restriction in a hardware, efficiency in the transfer, and load condition during operation.

Embodiment 5

In embodiment 1, the result from the first accumulation is transferred to the main memory by the DMA transfer in each time when the result is generated. However, it is also possible to perform the second accumulation in the processor.

A configuration of the system and a procedure of initialization of the system in embodiment 5 are same as in embodiment 1. Difference from embodiment 1 is stated for embodiment 5.

Figure 20:
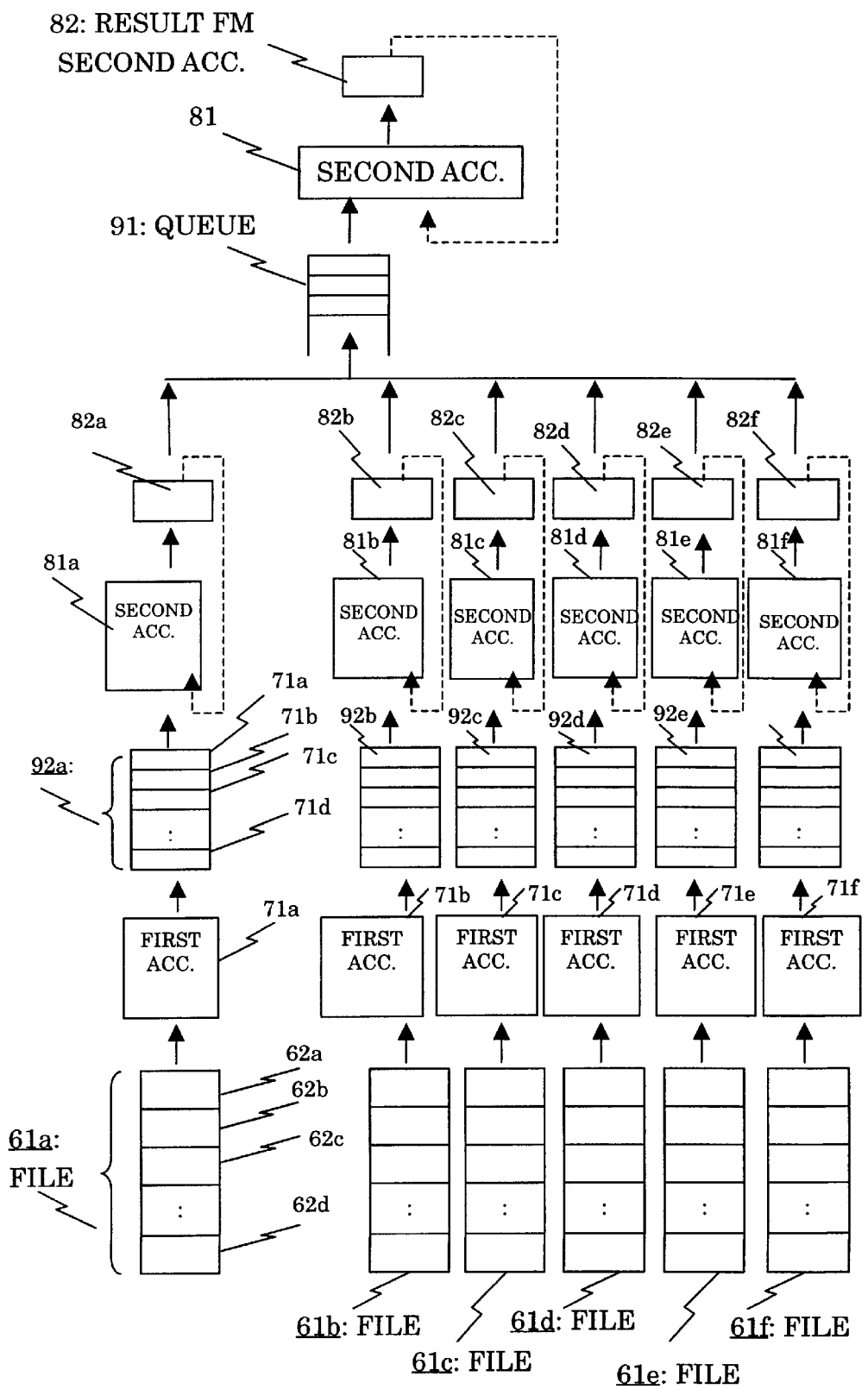
FIG. 20 illustrates an accumulation processing in another embodiment of this invention.

FIG. 20 illustrated the accumulation processing according to embodiment 5.

In FIG. 20, the files 61a–61f, second accumulations 81a–81f, and results 82a–82f from the second accumulations are illustrated.

In embodiment 1, the first accumulation 71a is performed by the processor 9a, and the results 72a–72d from the first accumulation 71a for each of the blocks 62a–62d are transferred in the buffer 10a in the main memory 2 for processing. Then, the second accumulation is performed by the CPU 1.

However, in embodiment 5, the second accumulation 81a of the results 72a–72d from the first accumulation is also performed by the processor 9a. The result 82a from the first accumulation 81a is stored in the output buffer in the processor 9a, and sent to the buffer 10a in the main memory 2 by the DMA transfer. Following processing is same as in embodiment 1.

Figure 21:
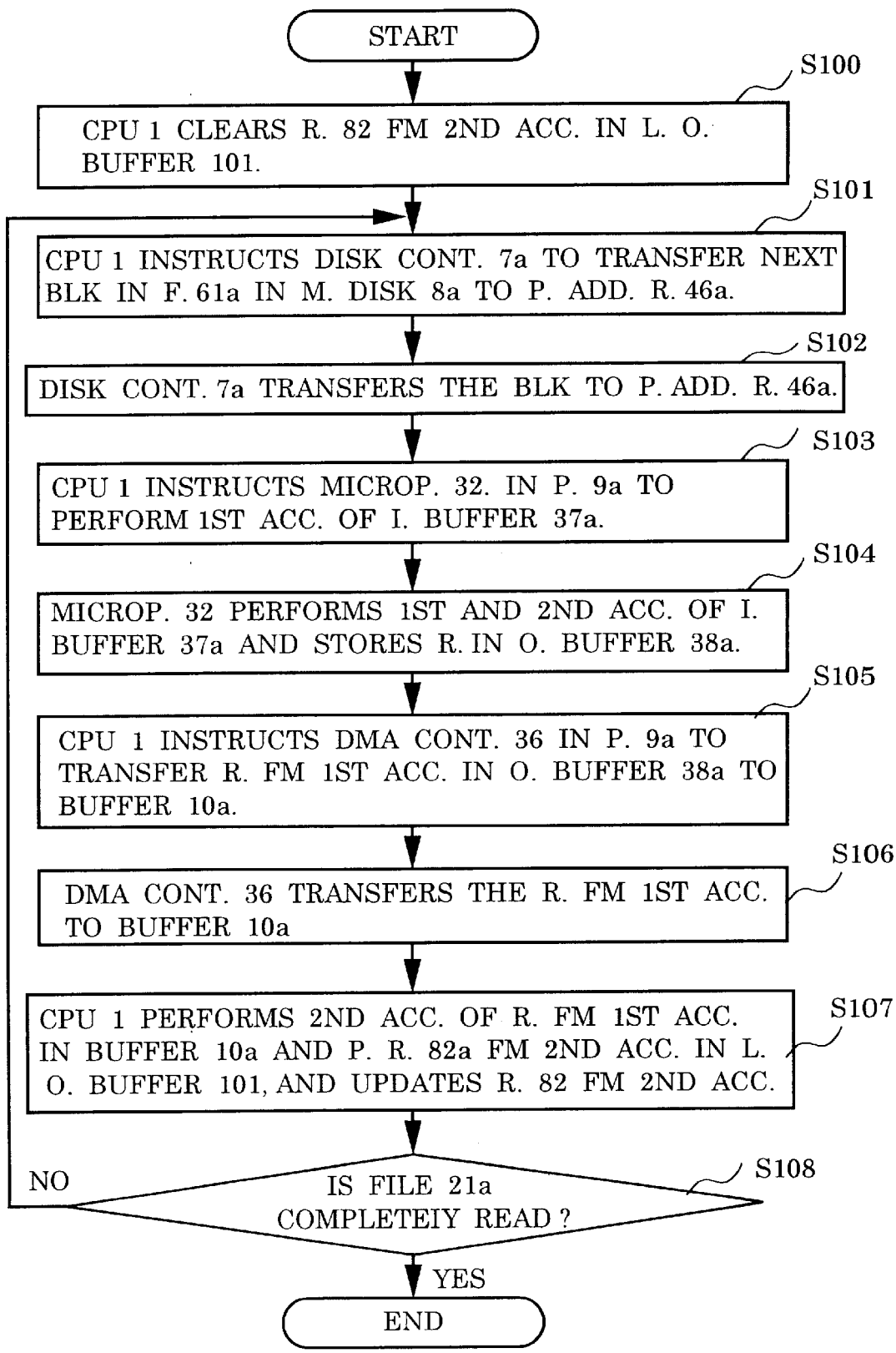
FIG. 21 shows a flow chart of operations in another embodiment of this invention.

FIG. 21 shows a flow chart of operations in embodiment 5.

In FIG. 21, the CPU 1 clears the result 82 from the second accumulation in the last output buffer 101. Accordingly, no record from the second accumulation is included in the result 82 from the second accumulation (step S100).

Then, the CPU 1 instructs the disk controller 7a to transfer a first block in the file 61a in the magnetic disk drive 8a to the physical address range 46a (step S101). The disk controller 7a reads out the data from the file 61a in the magnetic disk drive 8a. Then, the data are stored in the input buffer 37a in the local memory 33 (step S102).

After the data are transferred, the CPU 1 instructs the microprocessor 32 in the processor 9a to perform first accumulation and second accumulation of the data in the input buffer 37a (step S103)

The microprocessor 32 performs first accumulation and second accumulation of the data in the input buffer 37a, and outputs the result from the second accumulation to the output buffer 38a (step S104) .

The CPU 1 starts the DMA controller 36 in the processor 9a, and transfers the result 82a from the second accumulation in the output buffer 38a to the buffer 10a in the main memory 2 (step S105). Only the data in a size of the result 82a from the second accumulation is transferred, and it is not necessary to transfer the whole data in the output buffer 38a.

The DMA controller 36 transfers the data to the destination in the physical address range 48a of the buffer 10a in the main memory 2 (step S106).

The CPU 1 performs a second accumulation of the result from the second accumulation in the buffer 10a and the result 82 from the second accumulation in the last output buffer 101, and updates the result 82 from the second accumulation (step S107).

The CPU 1 performs the operations in steps S101–S107 for each of the blocks 62a–62d, etc. in the file 61a (step S108).

It is also possible to perform the operations in FIG. 21 by a plurality of processors 9a–9c in parallel as in embodiment 1.

Figure 22:
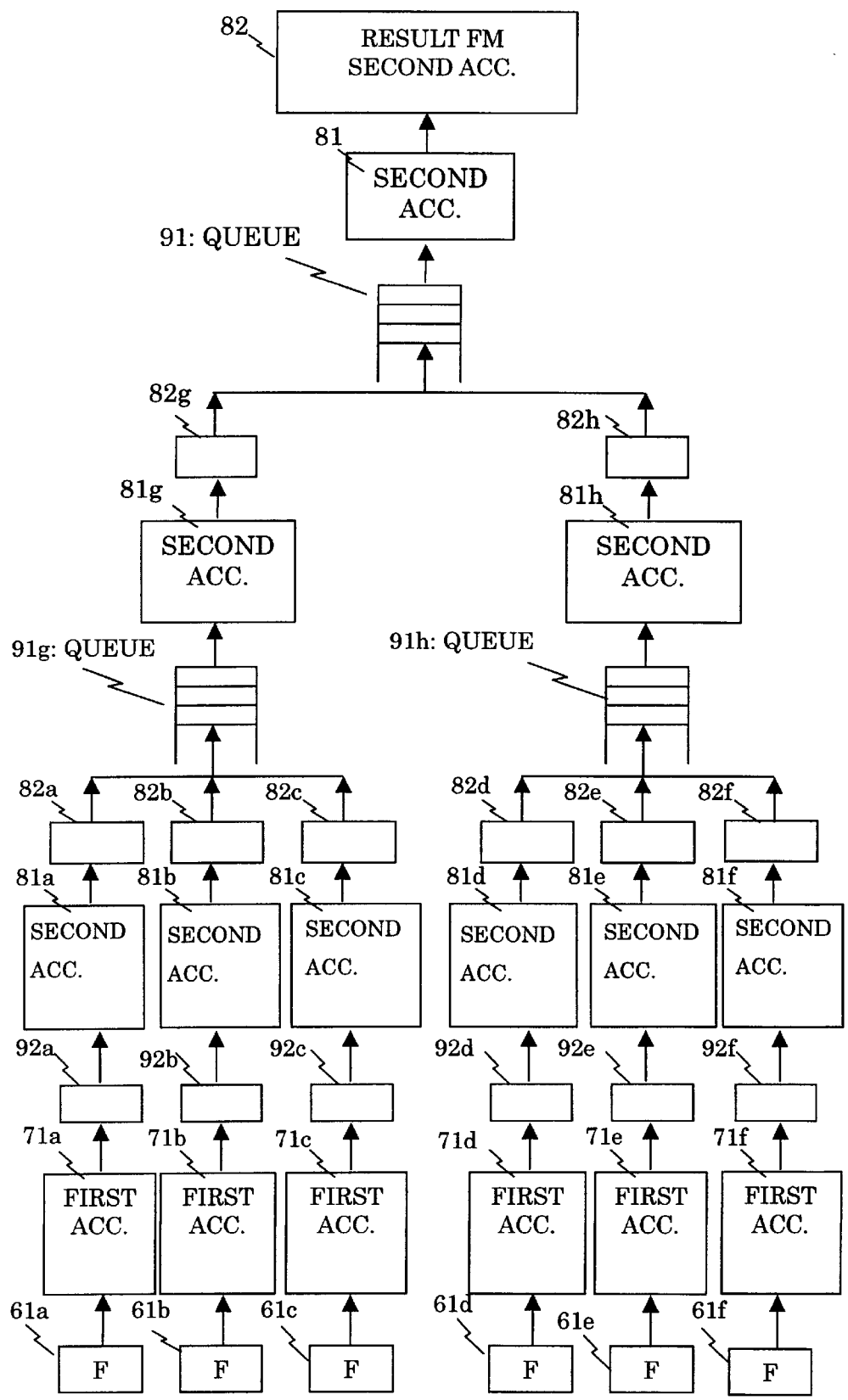
FIG. 22 illustrates a hierarchical accumulation processing in another embodiment of this invention.
Figure 23:
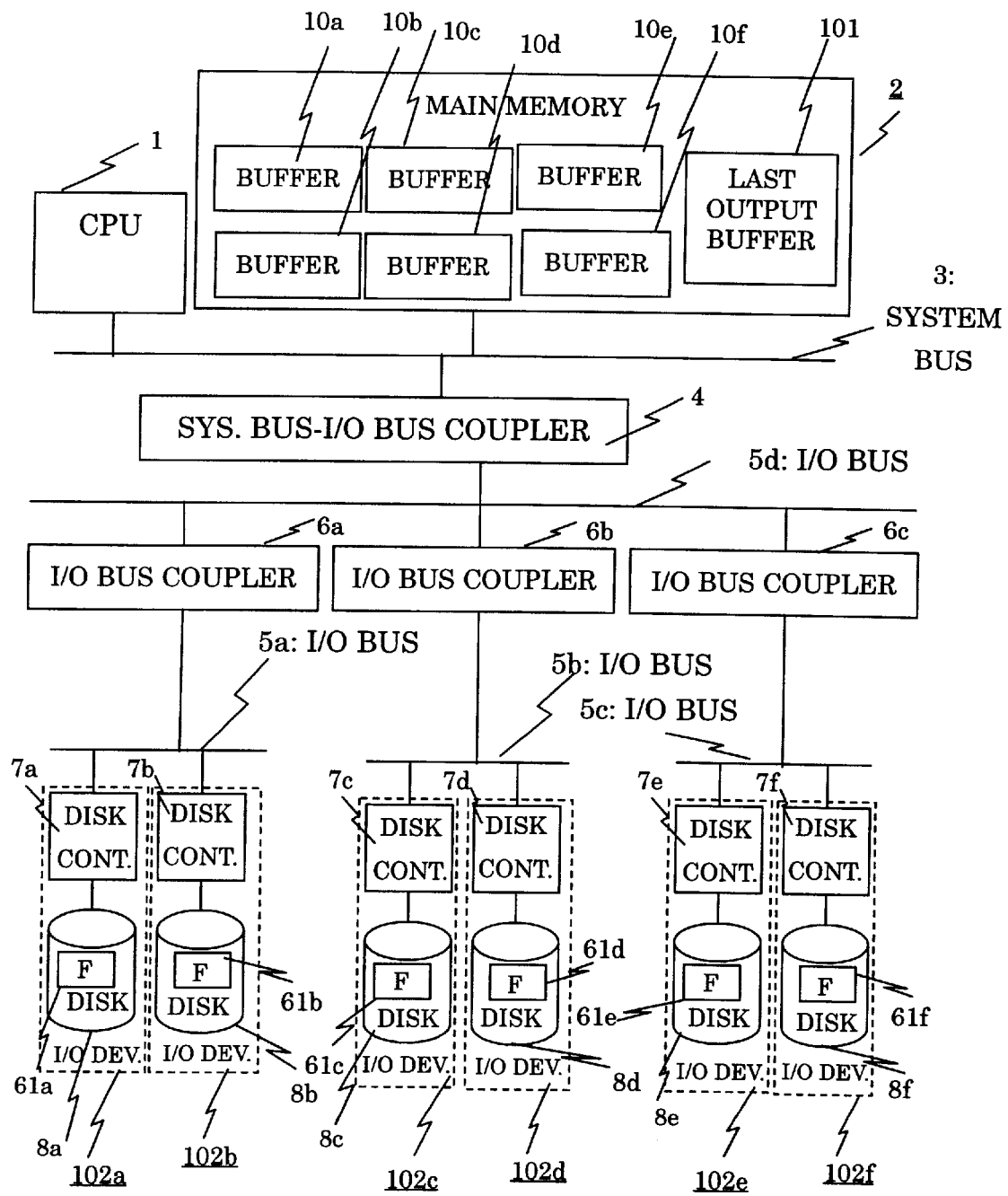
FIG. 23 shows a system configuration chart according to the related art.

In embodiment 5, the second accumulation can be performed hierarchically. In FIG. 22, the second accumulation is performed hierarchically by a plurality of processors.

In FIG. 22, second accumulations 81a–81f at the lower layer and second accumulations 81g and 81h at the upper layer are performed by different processors or same processor.

As stated, in the data processing apparatus according to embodiments 1–5, a processor is provided at each layer in the hierarchical bus. Data are transferred from an I/O device connected to the hierarchical bus to one or all processors without being channeled through the main memory. The data are processed by the processor before being sent to the main memory, the result is transferred to the main memory.

In the data processing apparatus, the data are transferred from the I/O device connected to the hierarchical bus to the main memory without being channeled through the processor in the hierarchical bus.

In addition to the illustrated operation, the data can be transferred to an opposite direction from the stated operation in the data processing apparatus according to embodiments 1–5.

In that case, processors are provided at all or part of the layers in the hierarchical bus. The data are transferred from the main memory to the processors, and the data are processed by the processors. It is also possible to transfer the results from the processors to a part or all of the I/O devices connected to the hierarchical bus without being channeled through the main memory.

In the data processing apparatus, the data can be transferred from the main memory to the I/O device connected to the hierarchical bus without being channeled through the processor in the hierarchical bus.

As stated, processors are provided at a part or all of the layers in the hierarchical bus, and the data are processed by the processors before being sent to the I/O device. Accordingly, the data amount transferred to the upper layer in the hierarchical bus can be reduced, and the data amount processed by the CPU can be reduced. Hence, when more I/O devices are connected to the hierarchical bus, an appropriate transfer speed and process speed can be realized.

In embodiments 1–5, the accumulation processing with the selection-projection processing is stated for a purpose of illustration. However, any kind of processing, e.g., counting number of data with a certain condition, searching a maximum value of data, searching a minimum value of data, etc., is possible as far as the data amount can be reduced in preprocessing. Further, this invention can be also applied to a more complicated processing of a combination of the above-stated processing.

In embodiments 1–5, the accumulation processing with the selection-projection processing is stated for a purpose of illustration. This invention can also be applied, even if a part of the above processing is combined. Even if the processing is a combination of one or two of selection, projection, and accumulation, this invention can be still applied by performing a part of processing in the embodiments.

In embodiments 1–5, the result of processing by the processor is transferred to the main memory directly. However, the result can be sent from the processor to the I/O device temporally before processing.

In embodiments 1–5, the second accumulation is performed by the CPU 1. However, the second accumulation can be performed by any processor. Generally, even if the processing is other than the accumulation processing, the processing after a reduction of the data amount can be performed by any processor instead of the CPU 1.

In embodiments 1–5, a magnetic disk drive is connected to a disk controller. However, a plurality of magnetic disk drives can be connected to a disk controller.

In embodiments 1–5, a file is in a magnetic disk drive. However, a plurality of files can be in a magnetic disk drive.

In embodiments 1–5, a processor is connected to an I/O bus. However, a plurality of processors can be connected to an I/O bus.

In embodiments 1–5, a number of input buffers corresponding to files is same as a number of the I/O devices. However, a plurality of buffers can be provided for a file for performing a so-called double buffering control, etc.

In embodiments 1–5, a number of output buffers for storing the result from the first accumulation is same as a number of the I/O devices. However, a plurality of buffers for an I/O device can be provided for performing the double buffering control, etc.

In embodiments 1–5, a number of buffers $10a$–$10f$ in the main memory 2 is same as the number of I/O devices. However, even if the number of buffers is one or more, a same effect with the embodiments can be realized by performing an appropriate exclusive control.

In embodiments 1–5, the processor is connected to the I/O device. However, the processor can be also connected to the system bus directly.

In embodiments 1–5, the system bus and the I/O bus are different types of buses. However, the system bus and the I/O bus can be a same kind of bus with a same control procedure.

In embodiments 1–5, all the I/O buses are a same kind of bus. However, even if one of the I/O bus is controlled in a different control procedure, a same effect with the embodiments can be realized by providing an appropriate bus coupler.

In embodiments 1–5, the magnetic disk drive and the disk controller for controlling the magnetic disk drive are used as the I/O device for a purpose of illustration. However, the I/O device can be any kind of storage, e.g., magnetic tape drive, semi-conductor disk drive, etc. The I/O device is also possible to be connected through a network connected by a transmission line, network file system, etc.

In embodiments 1–5, the number of the CPU 1 connected to the system bus is one. However, the number of the CPU 1 can be more than one.

In embodiments 1–5, the CPU initiates the file transfer and DMA transfer. However, the microprocessor in the processor can also initiate such operations.

A processor is provided in a part or all of the layers in the hierarchical bus according to this invention. The data transferred from the I/O device is processed by the processors, and data amount transmitted to the upper layer in the hierarchical bus is reduced. Further, a processing amount of data by the CPU is reduced. Even if more number of I/O devices are connected to the hierarchical bus, an appropriate transfer speed and processing speed can be realized.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A data processing apparatus comprising:
   an upper bus and a lower bus connected hierarchically;
   a memory connected to the upper bus;
   a processing unit connected to the upper bus for processing data in the memory;
   an input/output (I/O) device connected to the lower bus; and
   a processor connected to the lower bus for, in response to a request from the processing unit for data in the I/O device, receiving data from the I/O device via the lower bus, extracting a part of the data received from the I/O device to produce extracted data smaller in quantity than the data received from the I/O device, and transferring the extracted data to the memory via the upper bus, wherein the processing unit processes the data in the memory transferred from the processor.

2. The data processing apparatus of claim 1, wherein the processor transfers the data received from the I/O device to the memory after extracting the part of the received data and reducing data quantity by accumulation processing of the data received.

3. The data processing apparatus of claim 1, wherein the processor transfers the data received from the I/O device to the memory after extracting the part of the received data and reducing data quantity by counting the data received.

4. The data processing apparatus of claim 1, wherein the processor transfers the data received from the I/O device to the memory after extracting the part of the received data and reducing data quantity by extracting a maximum value from the data received.

5. The data processing apparatus of claim 1, wherein the processor transfers the data received from the I/O device to the memory after extracting the part of the received data and reducing data quantity by extracting a minimum value from the data received.

6. The data processing apparatus of claim 1, further comprising a bus coupler between the upper bus and the lower bus for connecting the upper bus to the lower bus, wherein the processor is unified with the bus coupler.

7. The data processing apparatus of claim 1, comprising a plurality of lower buses, a plurality of I/O devices, and a plurality of processors, wherein one of the plurality of processors connected to one of the plurality of lower buses receives data from one of the plurality of I/O devices connected to another lower bus of the plurality of lower buses.

8. The data processing apparatus of claim 1, wherein one of the plurality of I/O devices divides data in the one of the plurality of I/O devices and transfers the data divided to the plurality of processors.

9. The data processing apparatus of claim 7, wherein one of the plurality of processors transfers the extracted data to another of the plurality of processors, wherein the other of the plurality of processors receives data from the plurality of processors and further extracts another part of the data.

10. A data processing method in a data processing apparatus comprising:

an upper bus and a lower bus connected hierarchically;

a memory connected to the upper bus;

a processing unit connected to the upper bus for processing data in the memory' an input/output (I/O) device connected to the lower bus;

a processor connected to the lower bus, the data processing method comprising:

in response to a request from the processing unit for data from the I/O devices transferring data from the I/O device to the processor via the lower bus;

extracting in the processor, a part of the data transferred from the I/O device to the processor to produce extracted data smaller in quantity than the data received from the I/O device;

transferring the extracted data to the memory via the upper bus; and processing the data transferred from the processor via the upper bus in the memory with the processing unit.

11. The data processing method of claim 10 including extracting a part of the data transferred from the I/O device to the processor by accumulation processing of the data.

12. The data processing method of claim 10 including extracting a part of the data transferred from the I/O device to the processor by counting the data.

13. The data processing method of claim 10 including extracting a part of the data transferred from the I/O device to the processor by extracting a maximum value from the data.

14. The data processing method of claim 10 including extracting a part of the data transferred from the I/O device to the processor by extracting a minimum value from the data.

* * * * *